US012731154B2

(12) United States Patent
Kale et al.

(10) Patent No.: US 12,731,154 B2
(45) Date of Patent: Sep. 8, 2026

(54) UNIFIED CONTACT DATABASE SYSTEM WITH CUSTOMIZABLE MULTI-SOURCE DATA INTEGRATION

(71) Applicant: Notion Labs, Inc., San Francisco, CA (US)

(72) Inventors: Arpeet Kale, San Jose, CA (US); Guangyu Zhang, San Francisco, CA (US); Nishil Shah, San Francisco, CA (US)

(73) Assignee: Notion Labs, Inc., San Francisco, CA (US)

( * ) Notice: Subject to any disclaimer, the term of this patent is extended or adjusted under 35 U.S.C. 154(b) by 0 days.

(21) Appl. No.: 19/082,649

(22) Filed: Mar. 18, 2025

(65) Prior Publication Data

US 2026/0105458 A1 Apr. 16, 2026

Related U.S. Application Data

(60) Provisional application No. 63/708,113, filed on Oct. 16, 2024.

(51) Int. Cl.
*G06Q 30/02* (2023.01)
*G06F 21/62* (2013.01)
(Continued)

(52) U.S. Cl.
CPC ......... *G06Q 30/01* (2013.01); *G06F 21/6227* (2013.01); *G06Q 10/1093* (2013.01)

(58) Field of Classification Search
CPC ............... G06Q 30/01; G06Q 10/1093; G06Q 30/0207–30/0277; G06F 21/6227
See application file for complete search history.

(56) References Cited

U.S. PATENT DOCUMENTS 9,059,954 B1 * 6/2015 Cohen .................. H04L 51/212
9,591,086 B2 * 3/2017 Brezina .................. H04L 51/56
(Continued)

OTHER PUBLICATIONS

International Search Report and Written Opinion for International App. No. PCT/US2025/039884 filed Jul. 30, 2025, Applicant: Notion Labs, Inc., Date of Mailing: Nov. 25, 2025, 14 pages.

*Primary Examiner* — Thuy N Nguyen
(74) *Attorney, Agent, or Firm* — Perkins Coie LLP; Alberto Araiza; Lena Petrovic

(57) ABSTRACT

A system for managing contacts and tracking communication activities includes a database that obtains contact information from multiple sources including electronic communications. Multiple attributes are stored for each contact while deduplicating contact information and enabling sharing across accounts. Interactions are monitored by logging sent and received electronic communications, tracking meetings, and inferring relationship status based on interaction frequency. An activity feed displays a timeline of monitored interactions, shows communications related to specific contacts, and updates contact profiles based on tracked activities. A visual pipeline interface tracks transactions by visualizing relationship pipelines organized by status, displaying transaction progress, and enabling relationship development. Collaboration features including shared access to relationship data and permission-based controls for sensitive information are provided. AI capabilities are implemented for automated contact syncing, intelligent follow-up suggestions, and outreach campaign management. Reporting features generate insights by analyzing communication patterns and determining relationship strength.

20 Claims, 13 Drawing Sheets

(51) Int. Cl.
*G06Q 10/1093* (2023.01)
*G06Q 30/01* (2023.01)

(56) References Cited

U.S. PATENT DOCUMENTS 10,868,668 B1 12/2020 Griffin et al.
11,403,016 B1 * 8/2022 Ciubotariu ............ G06F 3/0619
12,405,982 B2 * 9/2025 Kundel ............... G06F 16/3344
12,596,532 B2 * 4/2026 Li ............................ G06F 8/34
2009/0030933 A1 * 1/2009 Brezina ................... H04L 51/42 707/999.102
2013/0217365 A1 * 8/2013 Ramnani ............... H04L 67/306 455/414.1
2014/0222793 A1 8/2014 Sadkin et al.
2014/0280065 A1 9/2014 Cronin et al.
2015/0134389 A1 5/2015 Punera et al.
2015/0205822 A1 * 7/2015 Jain ................... G06F 16/24578 707/803
2016/0019661 A1 1/2016 Bouganim et al.
2018/0121520 A1 * 5/2018 Degiere .................. H04L 51/04
2018/0218734 A1 8/2018 Somech et al.
2020/0327132 A1 10/2020 Sheasby et al.
2021/0224858 A1 7/2021 Khoury et al.
2022/0292525 A1 * 9/2022 Ash .......................... G06N 3/08
2022/0308848 A1 * 9/2022 Clement .................. G06N 3/09
2023/0101224 A1 * 3/2023 Singh ....................... G06N 3/08 707/770
2023/0185957 A1 * 6/2023 Brown ................... G06Q 50/01 726/26
2023/0206188 A1 * 6/2023 Khan ................... G06Q 10/107 705/7.19
2023/0308519 A1 * 9/2023 Cornelsen .......... G06Q 10/1093
2025/0292091 A1 * 9/2025 Smith .................... G06N 3/063
2025/0348372 A1 * 11/2025 Swift ...................... G06F 16/35
2025/0363360 A1 * 11/2025 Galvin ................... G06N 3/045
2025/0390526 A1 * 12/2025 Kundel ............... G06F 16/3344

* cited by examiner

FIG. 7

UNIFIED CONTACT DATABASE SYSTEM WITH CUSTOMIZABLE MULTI-SOURCE DATA INTEGRATION

CROSS-REFERENCE TO RELATED APPLICATION

This application claims the benefit of priority to U.S. Provisional Application No. 63/708,113, filed Oct. 16, 2024, the contents of which are incorporated by reference in their entirety.

BACKGROUND

Digital communication and relationship management technologies and systems can include various technical components including database management, synchronization protocols, and integration frameworks that enable the storage and processing of contact information and communication data. Communication platforms sometimes use database architectures to maintain contact information. Such platforms can implement data synchronization mechanisms to maintain consistency across different platforms and devices, while supporting various data import and export protocols. However, existing systems often require multiple separate platforms to handle electronic communications (e.g., emails, texts), contacts, calendars, and activities, leading to disjointed workflows and inefficiencies. Conventional solutions for contact management often require users to manage contacts across multiple systems, making it difficult to maintain a single source of truth. Further, traditional communication interfaces can impose arbitrary constraints with confusing default views and uninformative categorization. The fragmented nature of conventional systems sometimes requires manual logging of communications across different tools, resulting in duplicate data entry and inconsistent contact records.

BRIEF DESCRIPTION OF THE DRAWINGS

Reference will now be made, by way of example, to the accompanying drawings which show example embodiments of the present application, and in which:

FIG. 7 shows an interface that includes an integrated generative artificial intelligence (AI) tool that can be used with aspects of the present technology.

Figure 1:
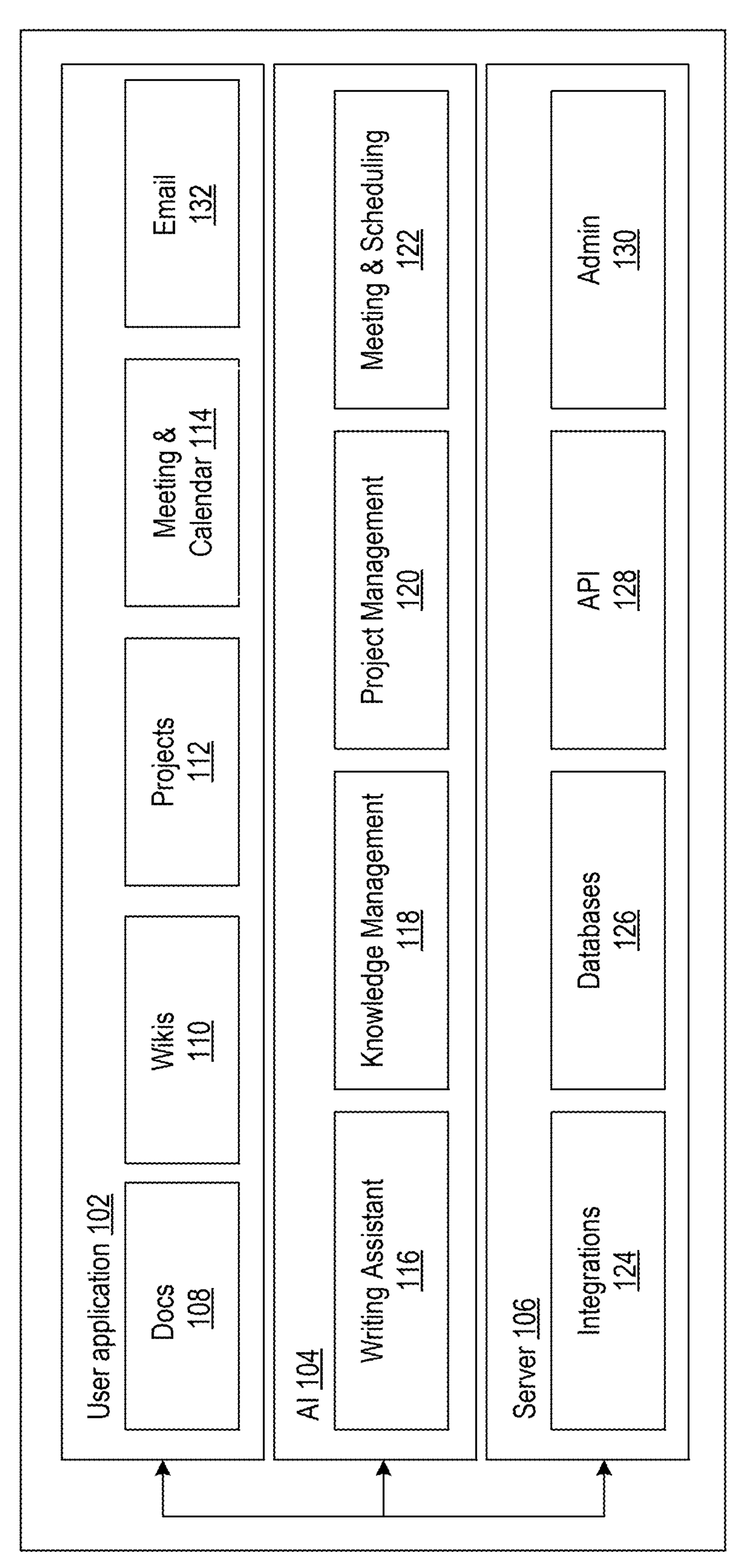
FIG. 1 is a block diagram of an example system to provide users with an all-in-one workspace for data and project management.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Described herein are methods, systems, and apparatuses for integrated contact management and activity tracking. The disclosed systems implement digital relationship management technologies using database systems and synchronization protocols within an integration framework. A comprehensive contact and activity management solution is implemented using an integrated architecture including multiple core modules. A contacts database module obtains contact information from multiple sources including electronic communication services, comma separated value (CSV) imports, and/or manual entries. The information can be automatically deduplicated while enabling secure sharing across accounts. In concert with the contacts database module, an activity tracking module monitors communication channels and automatically logs interactions, events, and/or meetings. Detailed activity feeds can be generated showing communication timelines. Contact profiles are updated based on observed interactions. The disclosed systems analyze communication patterns to infer relationship status and suggest appropriate follow-up actions.

Further, a pipeline management module performs relationship workflow management and provides interfaces for tracking transactions and associating transactions with specific contacts. The pipeline management module can visualize transaction status, progress, and/or value while integrating with task management functions. The pipeline management module can also enable teams to coordinate their relationship-building efforts using shared access to pipeline data. Supporting the core functions, a mail module handles electronic communications, while a reporting module can generate comprehensive insights by analyzing activity patterns and relationship trends. An integration module ties the disclosed systems together with external services using application programming interface (API) connections, enabling real-time synchronization with electronic communications.

The disclosed systems can implement security measures using permission-based access controls and secure data transmission protocols. Team collaboration features enable shared access to contacts and activity history while maintaining appropriate security boundaries. In addition, advanced artificial intelligence (AI) capabilities can provide automated contact syncing, intelligent follow-up suggestions, and/or automated outreach campaign management. The integrated approaches disclosed herein provide a unified platform for managing relationships, combining contact management, communication tracking, and relationship development functionalities. The modular architecture ensures scalability and flexibility while maintaining data integrity and security across all system components.

In some implementations, a computer system obtains contact information by integrating with electronic communications to sync contacts, processing CSV file imports, and/or accepting contact entries via an interface. The contact information is stored in a database that maintains comprehensive contact profiles with standard fields such as name and address as well as custom-defined attributes. Deduplication algorithms can automatically identify and merge duplicate contacts, such as when the same contact has multiple electronic communication addresses. For tracking activities, electronic communications and events are monitored by integration with electronic communication services; interactions are automatically logged and the associated contact profiles are updated. A chronological feed of monitored interactions is maintained. Electronic communications, meetings, and other engagement data are displayed in a timeline view that provides visibility into the complete history of interactions with each contact.

In some implementations, a computer system monitors electronic communications, logging messages while tracking calendar events and meetings using calendar service integration. Interaction frequency and patterns are tracked to infer relationship status, using metrics such as communication cadence and response times. A chronological timeline of interactions is maintained, displaying electronic communications, meetings, and other engagement data organized by contact. Contact profiles are automatically updated with recent activity data and relationship status indicators. A shared view of communication history can be accessed including last interaction dates and relationship status indicators. The communication history is analyzed to generate activity reports that summarize communication patterns, visualize relationship trends, and provide insights into engagement levels across contacts. Comments and tags can be added on activity items while secure access controls are maintained for sensitive information sharing across team members.

In some implementations, a computer system implements a visual pipeline interface, which tracks transactions by associating transactions with specific contacts, displaying key metrics such as transaction status, value, and progress through visual pipeline views organized by stage. Relationship development functionality is implemented to monitor interaction frequency and analyze communication patterns to infer relationship status and engagement levels. Based on the communication patterns, AI-powered suggestions are provided for follow-up actions and relationship improvement. Team collaboration is enabled using shared access to relationship data and communication history, with granular permission controls protecting sensitive information. Relationship insights are generated, relationship strength is determined, and potential transactions are identified. The visual pipeline interface integrates with the activity tracking and contact management to provide a unified view of relationships and associated transactions.

The disclosed systems provide advantages by their unified approaches to contact and relationship management. By centralizing contact information from multiple sources and automatically deduplicating data, the complexity of managing disparate systems is reduced while ensuring data accuracy. The automated activity tracking capabilities disclosed save time by eliminating manual logging of communications while providing comprehensive visibility into relationship history. Further, team collaboration is enhanced using shared access to contact information and communication history, enabling better coordination and consistent relationship management across organizations. Real-time integration with electronic communication services, combined with AI-powered features such as automated follow-up suggestions and outreach campaign management, increases efficiency and ensures important relationships are not neglected.

Moreover, the platform's scalable architecture can handle growing contact networks while maintaining flexibility using custom fields and properties. Advanced security features are used to protect sensitive relationship data using granular permission controls, while comprehensive reporting provides actionable insights into communication patterns and relationship trends. The integrated approach disclosed streamlines relationship management processes, improves productivity, and enables more effective relationship development.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested sub-pages inside of pages). The content attribute of a block stores the array of block IDs (or pointers) referencing those nested blocks. Each block defines the position and order in which its content blocks are rendered. This hierarchical relationship between blocks and their render children are referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks'content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No"]]). The client builds operations to represent the creation of a new block with those attributes. New blocks are not created in isolation: blocks are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into TransactionQueue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the /saveTransactions API endpoint. SaveTransactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database—meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from MessageStore using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example platform 100. The platform 100 provides users with an all-in-one workspace for data and project management. The platform 100 can include a user application 102, an artificial intelligence (AI) tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, a meeting and calendar template 114, and an email template 132. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, emails, and/or other pages (e.g., nested pages or sub-pages). Blocks can be assigned to certain properties. The blocks are defined by boundaries having dimensions. The boundaries can be visible or non-visible for users. For example, a block can be assigned as a text block (e.g., a block including text content), a heading block (e.g., a block including a heading), or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The email template 132 allows the users to customize their inbox by representing the inbox as a customizable database where the user can add custom columns and create custom views with layouts. One view can include multiple layouts including a calendar layout, a summary layout, and an urgent information layout. Each view can include a customized structure including custom criteria, custom properties, and custom actions. The custom properties can be specific to a view such as AI-extracted properties and/or heuristic-based properties. The custom actions can trigger automatically when a message enters the view. The custom actions can include deterministic rules like "Archive this," or assistant workflows like responding to support messages by searching user applications 102 or filing support tickets. In addition, the view can include actions, such as buttons, that are custom to the view and perform operations on the messages in the inbox. Only the customized structure can be shared with other users of the system, or both the customized structure and the messages can be shared.

The integration of the docs template 108, the wikis template 110, the projects template 112, the meeting and calendar template 114, and the email template 132 enables linking and embedding of templates within other templates. For example, an email sent from an email address within the platform 100 to another email address within the platform 100 can include an embedding of a document within the platform 100, or an embedding of a block within the document. In another example, a wiki can link to a meeting within the calendar.

The AI tool 104 is an integrated AI assistant that enables AI-based functions for the user application 102. In one example, the AI tool 104 is based on a neural network architecture, such as the transformer 212 described in relation to FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include autofilling information based on changes within the workspace or automatically tracking project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 100 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others. Unlike discriminative models, generative models are distinguished by their ability to create new, synthetic data that closely resembles the training data. In contrast, discriminative models focus on predicting labels for given inputs.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses large language models (LLMs).

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 2:
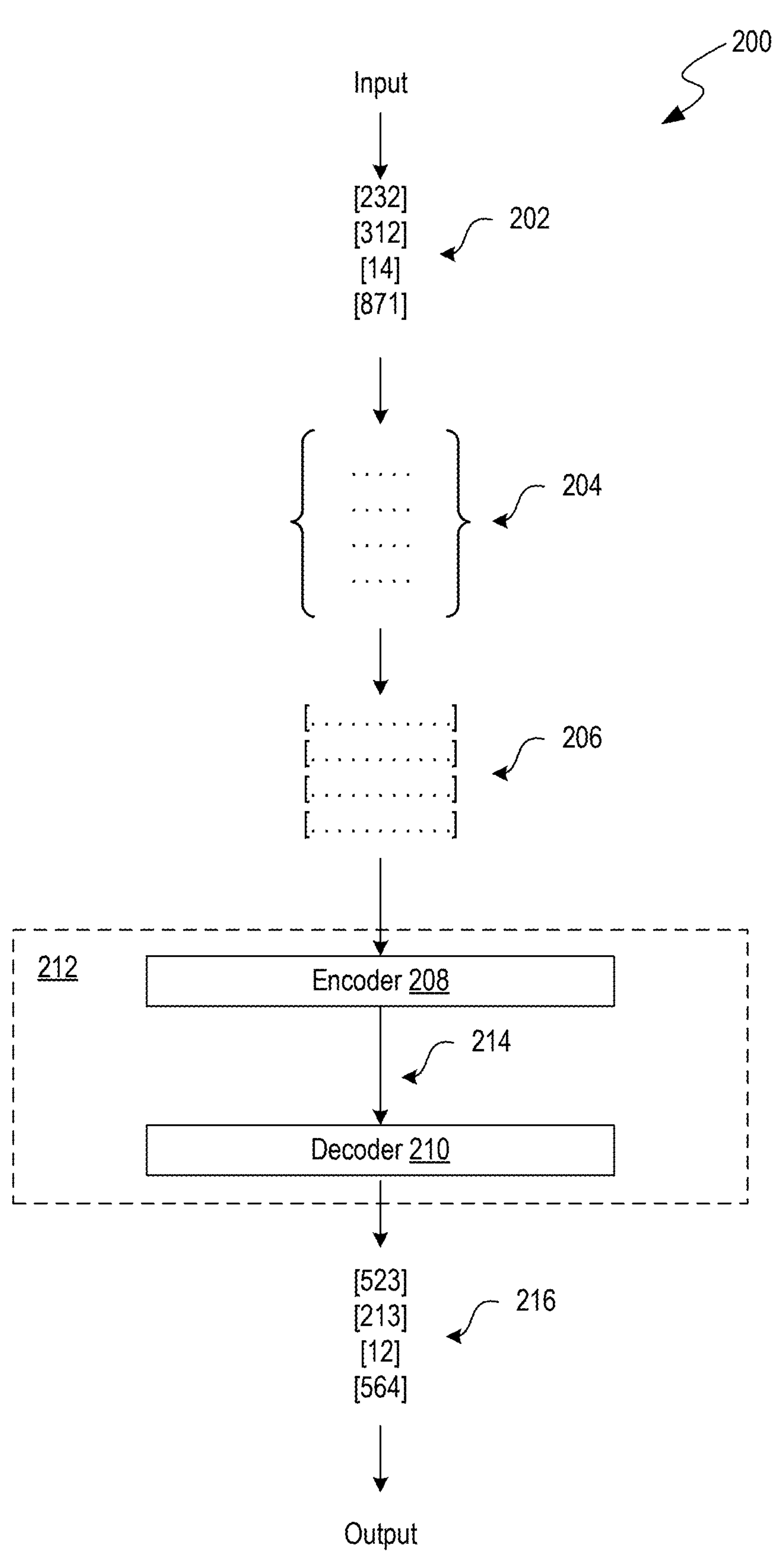
FIG. 2 is a block diagram of an example transformer.

FIG. 2 is a block diagram 200 of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco? " and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Hierarchical Organizational Blocks in a Workspace

Figure 3:
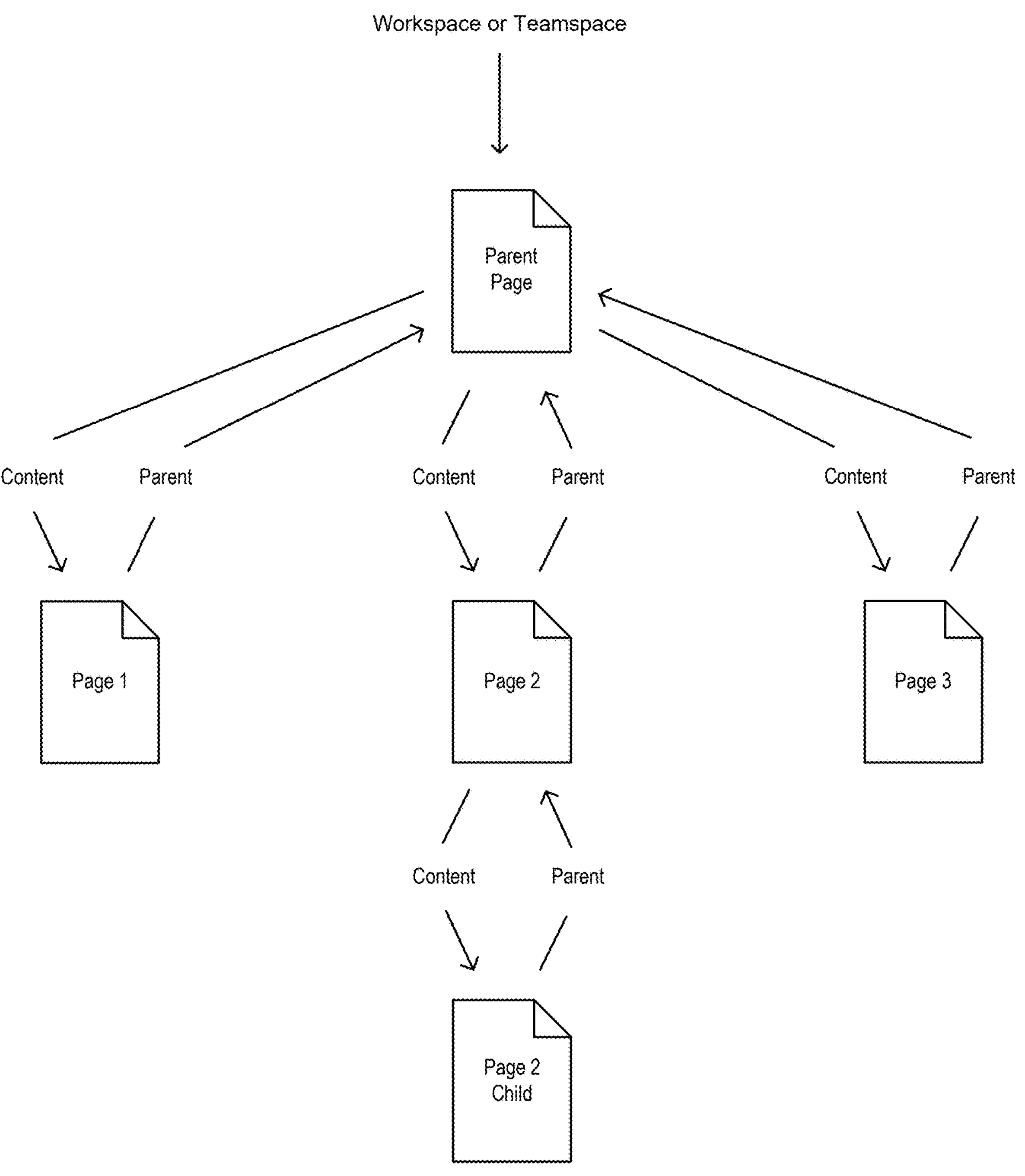
FIG. 3 is a block diagram illustrating a hierarchical organization of pages in a workspace.

FIG. 3 is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces, as shown in FIG. 3. The page can include a block such as tabs, lists, images, tables, etc.

A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 3, a parent page (e.g., "Parent Page") is located hierarchically below the workspace or a teamspace. The parent page includes three children pages (e.g., "Page 1," "Page 2," and "Page 3"). Each of the child pages can further include subpages (e.g., "Page 2 Child," which is a grandchild of "Parent Page" and child of "Page 2"). The "Content" arrows in FIG. 3 indicate the relationship between the parents and children while the "Parent" arrows indicate the inheritance of access permissions. The child pages inherit access permission from the (immediate) parent page under which they are located hierarchically (e.g., which is above them in the tree). For example, "Page 2" inherited the access permission of the "Parent Page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 3 so that it is different from the access permission of "Page 2" and "Parent Page." The access permission of "Page 2 Child" can be modified to be broader or narrower than the access permission of its parents. As an example, "Page 2 Child" can be shared on the internet while "Page 2" is only shared internally to the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Contact Database System With Multi-source Data Integration

Figure 4:
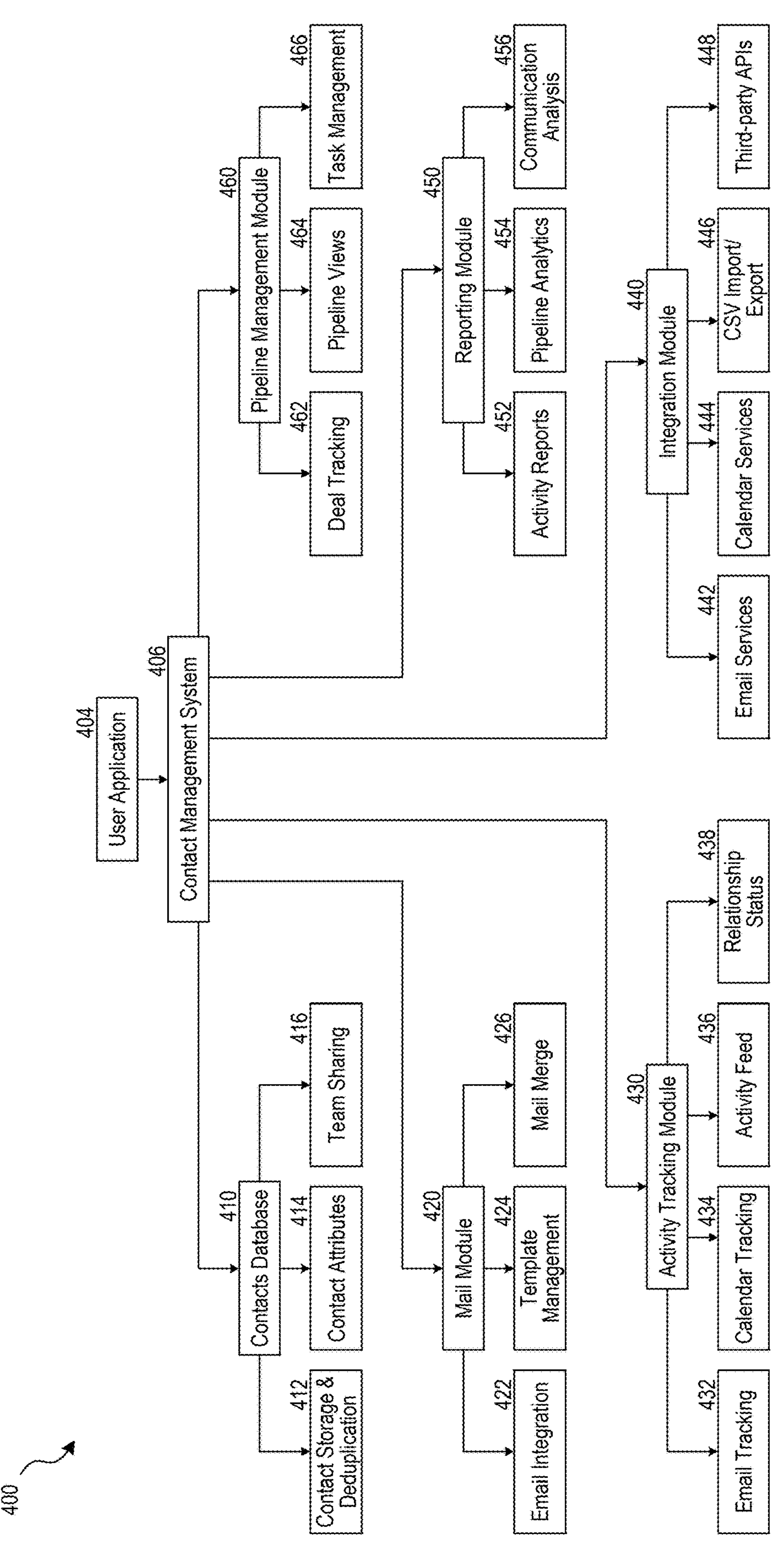
FIG. 4 is a block diagram illustrating an example system for integrated contact management and activity tracking.

FIG. 4 is a block diagram illustrating an example system 400 for integrated contact management and activity tracking. The user application 404 shown by FIG. 4 provides an interface for the integrated contact management and activity tracking functionality. For example, the user application 404 enables users to manage contacts, track communication activities, and coordinate relationship-building efforts on a unified platform. The user application 404 can implement security measures using permission-based access controls while maintaining appropriate security boundaries for team collaboration. The contact management system 406 implements comprehensive contact and activity management functionality using the interconnected modules shown by FIG. 4. The contact management system 406 includes a contacts database 410 for storing and deduplicating contact information, an activity tracking module 430 for monitoring communications, a pipeline management module 460 for tracking relationship workflows, and a reporting module 450 for analyzing interaction patterns. The contact management system 406 integrates with electronic communications services while implementing security controls for team collaboration. The modular architecture enables scalable contact management and relationship development through a unified platform.

In some implementations, the contacts database module 410 implements a contact storage and deduplication component 412, a contact attributes component 414, and a team sharing component 416. The contacts database module 410 can obtain contact information from multiple sources and deduplicate contacts. For example, the contact storage and deduplication component 412 obtains contact information from electronic communications services 442, CSV imports 446, and/or manual entries, automatically identifying and merging duplicate contacts (such as when the same contact has multiple addresses). The system 400 can use addresses as unique identifiers to detect duplicates and can suggest potential duplicates for manual merging. The contact attributes component 414 can maintain comprehensive contact profiles with standard fields such as name and electronic communication as well as custom-defined attributes in a database. The team sharing component 416 enables secure sharing of contacts across team members using permission-based access controls. Team members can sync contacts across a workspace to ensure everyone has access to up-to-date information.

The mail module 420 handles electronic communications operations using an email integration component 422, a template management component 424, and a mail merge component 426. The mail module 420 integrates with email services 442 to sync contacts and process communications. The email integration component 422 implements integration with email services 442 to sync contacts and monitor electronic communication. The integration enables real-time synchronization of electronic communications while maintaining secure data transmission protocols. The template management component 424 generates templates for recurring communications such as newsletters, follow-ups, or announcements. The templates can be customized and reused to streamline communication workflows while maintaining consistency across team members. The mail merge component 426 supports bulk electronic communications, enabling sending of personalized electronic communications to contact lists. Automated outreach campaign management can be performed using the mail merge functionality while maintaining appropriate security controls.

In some implementations, comprehensive security measures are implemented using multiple technical layers. For example, the security framework includes permission-based access controls and secure data transmission protocols that protect sensitive contact and communication data. The system 400 can enable granular permission controls that allow administrators to determine which team members can view or edit specific contact information and activity history, ensuring sensitive data is only shared with appropriate team members. For data transmission security, the system 400 implements secure protocols for synchronizing information between components. For example, an API (similar to or the same as the API 128 described in more detail with reference to FIG. 1) processes transactions between components while enforcing security protocols during data exchange. The integration module 440 can implement secure API connections that enable protected communication between the user application 404, AI system 1200 (illustrated and described in more detail with reference to FIG. 12), databases and external services. In some implementations, security boundaries are managed using permission systems and encryption protocols. For example, the administration unit 130 (shown by FIG. 1) manages user accounts, data storage, security, and performance monitoring to maintain system-wide security.

The activity tracking module 430 monitors communication channels using an email tracking component 432 and calendar tracking component 434. The activity tracking module 430 can automatically log electronic interactions, events, and meetings while generating detailed activity feeds showing communication timelines. The activity tracking module 430 can analyze interaction patterns to infer relationship status 438 and suggest appropriate follow-up actions. The relationship status 438 represents the strength and engagement level of connections between contacts, determined by analyzing communication patterns including electronic communication exchanges, meeting participation, and interaction frequency, while tracking response times and engagement metrics using automated monitoring. The email tracking component 432 automatically monitors electronic communication interactions by logging sent and received messages while tracking response times and engagement metrics. Further, communication patterns can be analyzed to infer the relationship status 438 and engagement levels based on interaction frequency.

In some implementations, the activity tracking module 430 analyzes communication patterns by monitoring interaction metrics. The system 400 can process the communication patterns using machine learning models implemented using a transformer-based neural network architecture (illustrated and described in more detail with reference to FIG. 2), which analyzes the communication patterns to determine follow-up timing based on historical interaction data. An "autopilot" feature can analyze thread context and communication history to generate contextually-appropriate follow-up suggestions. Historical data can be processed through multiple neural network layers while considering metrics such as response times and engagement levels. The block data model (shown by FIGS. 1 and 3) can be leveraged to store interactions with timing and engagement properties that the AI system 1200 analyzes (e.g., using a neural network to identify patterns). For example, AI model parameters are optimized using loss functions and regularization techniques, with the functionality implemented using an API that enables real-time processing.

The calendar tracking component 434 integrates with calendar services to monitor meetings and events related to contacts. Calendar events, meeting attendance, and schedules can be tracked while maintaining a comprehensive timeline of interactions. The activity feed component 436 displays a chronological timeline of monitored interactions, including electronic communications, meetings, and other engagement data organized by contact. Users can add comments and tags on activity items while the system 400 maintains secure access controls for sharing sensitive information across team members. The activity feed generated enables teams to determine who last communicated with a contact, helping avoid duplicate outreach or missed follow-ups. The system 400 automatically updates contact profiles based on recent activity data and relationship status indicators.

The integration module 440 implements comprehensive integration capabilities across multiple services. The email services 442 enable real-time synchronization of contact data using standardized APIs, monitoring and logging messages. The system 400 connects with calendar services 444 using APIs to enable real-time monitoring of meetings and events, logging attendance and updating contact profiles based on meeting participation. The CSV import/export functionality 446 can process structured data files to extract and store contact information while maintaining data integrity. For third-party integrations, API connections 448 are implemented to enable protected communication between components while supporting integration with sales automation platforms and AI-driven enrichment tools. The integration module 440 coordinates these components using WebSocket connections that enable real-time updates, with the MessageStore service managing synchronized data and the SaveTransactions process persisting changes. For example, the system 400 can maintain data consistency using the SyncRecordValues API.

The pipeline management module 460 provides interfaces for tracking transactions using transaction tracking 462, pipeline views 464, and task management 466 components. The pipeline management module 460 visualizes transaction status and progress while integrating with task management functions to coordinate relationship-building efforts. The pipeline management module's transaction tracking component 462 associates transactions with specific contacts in a database, tracking key metrics such as transaction status, value, and progress. The pipeline views component 464 provides visual representations of transactions organized by stage, enabling teams to monitor relationship development and transactions through shared access to pipeline data. The task management component 466 integrates with the tracking functionality to coordinate follow-ups and relationship-building activities.

The reporting module 450 generates insights by analyzing activity patterns and relationship trends using multiple components. The activity reports component 452 generates reports summarizing communication patterns, visualizing relationship trends, and providing insights into engagement levels. The pipeline analytics component 454 provides visual representations of transactions, enabling tracking progress of transactions through different pipeline stages while monitoring changes in status. The communication analysis component 456 can analyze patterns in monitored interactions to generate relationship insights, determine relationship strength, and identify potential transactions. The system 400 can implement security measures using permission-based access controls and secure data transmission protocols while maintaining appropriate security boundaries for team collaboration features. The modular architecture of system 400 provides scalability and flexibility while maintaining data integrity and security across the system components.

Figure 5:
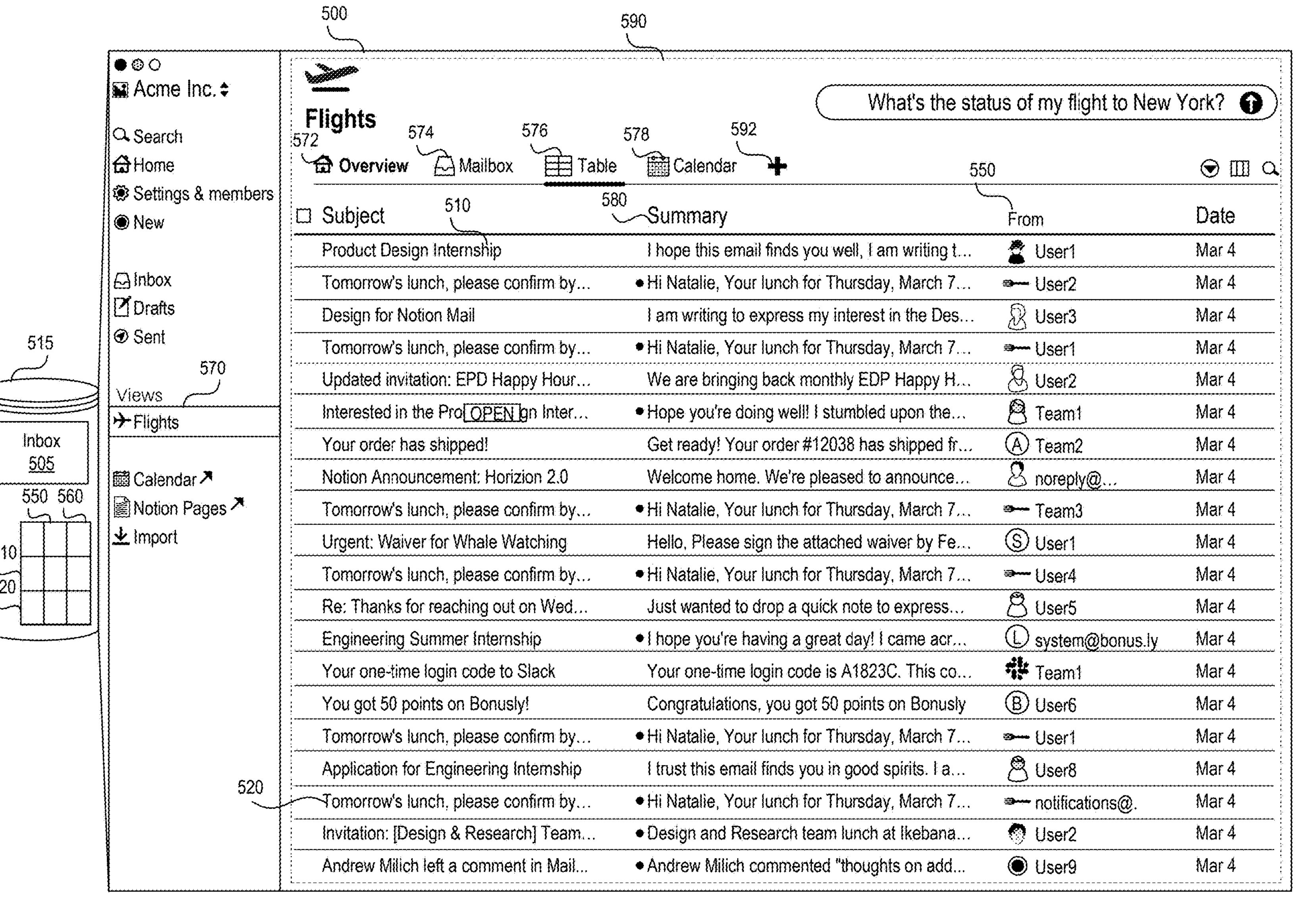
FIG. 5 shows an interface that can implement aspects of the present technology.

FIG. 5 shows an interface 500 that can implement aspects of the present technology. The inbox 505 shown can be used to obtain contact information for one or more contacts from email services 442 (illustrated and described in more detail with reference to FIG. 4). The contact information is stored in a database 515. For example, the inbox 505 contains multiple messages 510, 520 that can include electronic communication messages, text messages, and instant messages. The interface 500 is associated with a view 570 and represents a subset of all messages included in inbox 505 stored in database 515. The database 515 implements contact storage and deduplication while enabling secure sharing across team members. The database 515 includes multiple rows of messages 510, 520 and multiple columns 550, 560 that are included in the view 570.

The interface 500 can display multiple views 570 with multiple layouts 572, 574, 576, 578 that enable tracking communication activity associated with the one or more contacts. Each view can be customized and includes criteria for selecting a subset of messages 510, 520 to present in the view 570. The criteria can be based on sender, content, date, recipients, attachments, and AI-extracted properties to automatically monitor electronic communication interactions involving the contacts. The view 570 can filter messages based on sender attributes, such as airlines, or content attributes, such as flights. Activity feeds can be generated displaying timelines of tracked communication activity by filtering electronic communications, such as those received from specific senders. The views enable updating profiles of contacts based on tracked communication patterns while maintaining appropriate security boundaries.

Electronic communications and threads can be tagged with attributes such as:

Important (including a user-learned definition of what is important and the user needs to respond to)
Calendar transactional electronic communications
Trips
One-off "projects"
"Trip to Italy in June"
"2024 taxes"
"Buying a car"
Packages/Deliveries
Candidates (and related views for job offers, onboarding)
Customers
Reservations
Family
Coupons/discounts
Company (i.e., all electronic communications with people who work at the same company or a team at that company, which can be an external company)
Positive replies (e.g., mass marketers who want to filter out all the angry replies)
Support inbox
Photos (e.g., Hawaii trip 2024 photos)
Doctor appointments
Tickets (movies, concerts)
Waiting for your reply
Legal contracts
Cap table
School work (e.g., ECON 101 view, or "clubs" or "college applications" view)
Education (Udacity, Khan Academy, Coursera)
Newsletters
Personal finance, credit card and bank statements
Purchases
Clothing purchases with brand and sizing
Work vs. personal
Social media
Subscriptions (Netflix, DisneyPlus, iCloud, Spotify), expiring subscriptions
Sports (general sports content)
Sports team (filter on team)
Housing (apartments, rentals, home buying, Airbnb)
"Snooze" (e.g., could be implemented as a property in a view or an automation that can automatically snooze a category of electronic communication, say for the weekend)
Relevant people column
Electronic communications with attachments The view 570 enables personalization by allowing users to automatically monitor interactions with contacts using custom columns 580. The interface component 590 includes a button 592 that enables users to define custom columns 580 for tracking communication activity associated with the contacts. The custom columns 580 can display relationship status indicators showing stages such as beginning, in progress, or concluded based on the monitored interactions. For example, the custom columns 580 can include location, AI-extracted properties, and calendar dates, enabling sharing across team members of interaction history and relationship status 438 (shown by FIG. 4). Relationship status 438 can be inferred (e.g., using AI) based on the frequency of monitored interactions displayed in these custom views. For attachment-related views, custom columns 580 can display thumbnail previews, allowing the system 400 (shown by FIG. 4) to generate activity reports summarizing patterns in the monitored interactions.

The views can be used to implement a team collaboration interface that includes visualizations of interaction history while maintaining appropriate permission controls for access. An AI system provides suggested follow-up actions based on the monitored interaction patterns shown in the custom columns 580. The custom views enable tracking transactions associated with contacts while displaying progress through pipeline stages. The system automatically identifies patterns in monitored interactions to determine relationship status and engagement levels.

The view 570 can be generated by analyzing the inbox 505 during onboarding, or during usage to find a frequently occurring type or category of electronic communication from a contact, such as 300 past electronic communications from United, 50 messages containing attachments, 200 messages with hyperlinks, shopping newsletters, customer relationship management, etc. Upon finding the frequently occurring type of electronic communication from a contact, a curated flight view 470 can be suggested that was made and shared by another user of the system or by the system. Labels within a view can also be automatically generated and suggested. For example, "United", "Delta" or "Alaska" can be suggested as labels from a specific airline contact for a custom column in a flight view.

Figure 6:
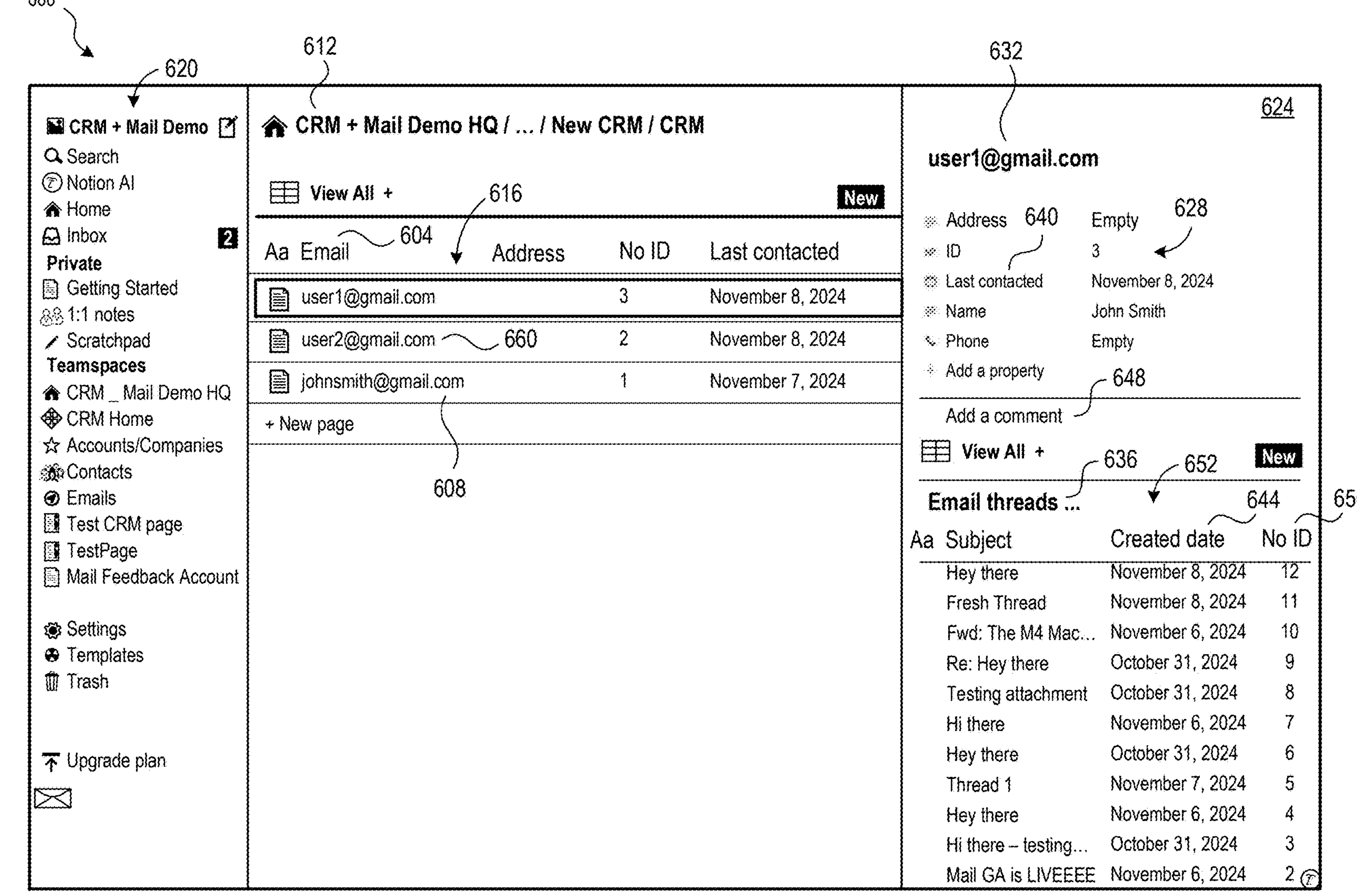
FIG. 6 shows an interface for integrated contact management and activity tracking.

FIG. 6 shows an interface 600 for integrated contact management and activity tracking that obtains contact information 616 for multiple contacts 608 from various sources (e.g., email services 604, CSV imports, and/or manual entries). The interface 600 implements a database 612 configured to store multiple attributes 628 for each contact 632, including names, electronic communication addresses, companies, job titles, and/or custom-defined fields. The system 400 (shown by FIG. 4) can deduplicate the contact information 616 across sources while enabling secure sharing across team members using permission-based access controls. The deduplication process uses email addresses of contacts 632 as unique identifiers to detect and merge duplicate contacts. For example, when a contact "John Smith" appears with different electronic communication addresses, the system can identify these entries as belonging to the same contact based on the electronic communication identifiers. The system generates suggestions for potential duplicates that users can manually review and approve for merging using the interface 600.

The database 612 maintains comprehensive contact profiles that are automatically updated based on tracked communication activities. Electronic communication interactions and calendar events associated with contacts 632 are monitored using integration with electronic communication and calendar services. This integration enables real-time synchronization of contact data while maintaining appropriate security boundaries. The interface 600 implements team collaboration features by providing shared access to the contact information 616 and communication history. Team members can view and contribute to ongoing communications while the system maintains secure permission controls. The modular architecture provides scalability and flexibility while preserving data integrity across components of the interface 600. Communication patterns can be analyzed to infer relationship status 438 (shown by FIG. 4) and engagement levels based on interaction frequency, enabling automated follow-up suggestions and outreach campaign management.

The hierarchical navigation structure 620 displays sections such as "CRM Home" and "Contacts" that implement a database configured to store multiple attributes 628 for contacts. The database 612 can display attributes 628 in a popup window 624 including names, electronic communication addresses, companies, job titles, and/or custom fields. The popup window 624 tracks communication activity by automatically monitoring email interactions 636 and calendar events associated with contacts using integration with electronic communication and calendar services. Sent and received electronic communications are logged while calendar meetings are tracked to maintain a comprehensive timeline of interactions. The "Last contacted" timestamps 640 are automatically updated based on the tracked communications, enabling the system to infer relationship status based on interaction frequency patterns. The interface 600 implements team collaboration features by providing shared access to contact information and communication history. The activity tracking functionality can update contact profiles based on monitored interactions while maintaining appropriate security boundaries.

Figure 7:
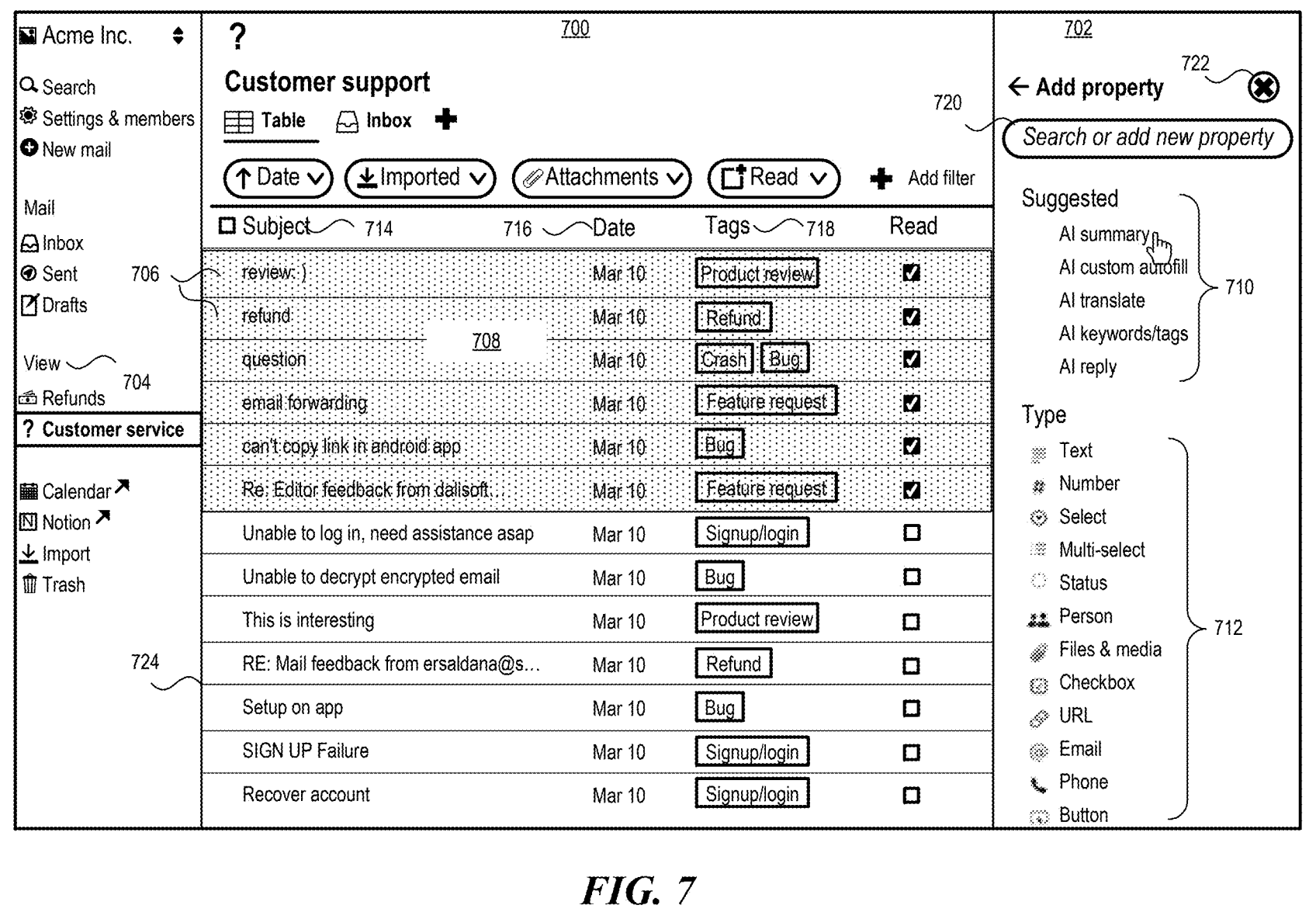

Further, pipeline management functionality is used to implement interfaces for tracking transactions associated with contacts and displays transaction progress through visual pipeline views as shown in FIG. 7. For example, a visual pipeline interface (shown by FIG. 11) is generated that tracks transactions while displaying progress of transactions through different stages. Electronic communication threads are displayed chronologically with creation dates 644, enabling teams to monitor the status of transactions and relationships using shared access to pipeline data. The interface 600 enables team collaboration using shared access to contact information and communication history while maintaining appropriate permission controls. Users can add comments 648 and tags on activity items to provide context and updates. Security measures can be implemented using permission-based access controls and secure data transmission protocols to maintain appropriate security boundaries for team collaboration features.

The activity feed 652 displays a timeline of tracked communication activity by automatically monitoring electronic communication interactions and calendar events associated with contacts. The activity feed 652 shows chronological communications while enabling secure sharing across team members using permission-based access controls. Custom fields can be added using the "Add a property" button, allowing users to store multiple attributes 628 for each contact including names, electronic communication addresses, companies, job titles and/or custom-defined fields. The database 612 is configured to maintain these attributes while automatically deduplicating contact information across sources. An AI system provides suggestions for follow-up actions based on analyzing communication patterns, as shown in FIG. 7. Custom fields 656 enable relationship tracking by maintaining comprehensive contact profiles that are automatically updated based on monitored interactions.

In some implementations, the modular architecture of the interface 600 is used to implement security measures using permission-based access controls and secure data transmission protocols. The system enables managing automated outreach campaigns to contacts by analyzing communication patterns to determine engagement levels. The interface 600 can visualize trends in monitored interactions by generating activity reports summarizing patterns in the tracked communications. An AI system can automatically identify inactive relationships, such as contact 660, by analyzing interaction frequency and providing suggestions for follow-up actions. The comprehensive visibility into relationship development is achieved using integrated contact management and activity tracking capabilities. The modular architecture ensures scalability and flexibility while preserving data integrity using secure data transmission protocols across all system components.

FIG. 7 shows an interface 700 that includes an integrated generative artificial intelligence (AI) tool (displayed in a popup window 702) that can be used with aspects of the present technology. The interface 700 automatically monitors interactions with contacts by logging sent and received electronic communications while tracking calendar events. The interface corresponds to the interface 600 shown in FIG. 6 and includes multiple email messages 706 arranged in a table 724 with multiple columns. The columns display properties of the email messages including a subject column 714, date column 716, and tags column 718 that enable tracking communication activity patterns. The system infers relationship status 438 (shown by FIG. 4) based on the frequency of monitored interactions shown in these columns.

The interface includes email from a particular view 704 that represents a subset of all messages 706 in the inbox, enabling sharing of interaction history across team members. The view implements a team collaboration interface that includes visualizations of monitored interactions while maintaining appropriate permission controls for access. The system generates activity reports summarizing patterns in the monitored interactions displayed in the table 724. The interface enables tracking transactions associated with contacts while displaying progress through pipeline stages. The system automatically identifies patterns in monitored interactions to determine relationship status and engagement levels based on the communication history shown in the views.

The interface 700 includes an AI email tool (displayed in the popup window 702) that provides suggested follow-up actions based on monitored interactions with contacts. The AI email tool can be opened as a sidebar or popup window while concurrently displaying the table 724 of email messages 706, and can be closed via a control element 722. The AI email tool enables adding AI-generated content to the email interface by analyzing communication patterns to determine relationship status and engagement levels. The content is generated by AI system 1200 (shown by FIG. 12) based on email message content and user instructions, including default operations such as summarization or translation. The system automatically monitors interactions by analyzing either all email messages 706 or a subset 708 that can be selected based on user input or filtering criteria. The subset 708 can be filtered based on read status, tags, sender name, date, size, or attachment presence, enabling the system to generate activity reports summarizing patterns in the monitored interactions.

A team collaboration interface can be implemented that includes visualizations of interaction history while maintaining appropriate permission controls for access. The system tracks transactions associated with contacts by analyzing communication patterns shown in a filtered message views. An AI system provides suggested follow-up actions based on the analyzed interaction patterns while automatically identifying inactive relationships that may require attention.

The AI email tool includes a prompt block 720 that enables automatically monitoring interactions with contacts by allowing users to provide instructions to an AI system. Users can input instructions using the prompt block 720 to send them for AI processing while the system tracks communication patterns. The tool includes predefined prompts 710 that define content types such as email summaries, custom autofill, translations, keywords/tags, and replies. An AI system provides suggested follow-up actions based on analyzing these communication patterns to determine relationship status and engagement levels. The AI email tool suggests different predefined prompts 710 based on email content, user profiles, and prompt usage history, enabling sharing of interaction patterns across team members. The system includes suggested property types 712 for adding content to the message table 724, incorporating both AI and non-AI properties to facilitate email organization.

The suggested property types 712 enable tracking transactions by allowing users to add priority attributes for message triage. The system can automatically determine message priority using AI computation while maintaining appropriate permission controls. The interface implements team collaboration features using suggestions generated by an AI system while automatically identifying patterns in monitored interactions to determine relationship status and engagement levels.

In response to providing a prompt using either the predefined prompts 710 or prompt block 720, along with selecting email messages 706, the system automatically monitors interactions with contacts by processing the prompt and message content using the AI system. The system infers relationship status based on analyzing communication patterns while generating activity reports summarizing the monitored interactions. The AI system generates content based on the prompt and selected messages 706, enabling sharing of interaction history across team members using the interface 700. A team collaboration interface can be implemented that includes visualizations of the monitored interactions while maintaining appropriate permission controls. For example, when providing an “AI summary” prompt instruction, the table 724 is modified to include AI-generated email summaries in a new column. This enables tracking transactions associated with contacts by automatically identifying patterns in the monitored interactions to determine relationship status and engagement levels.

Figure 8:
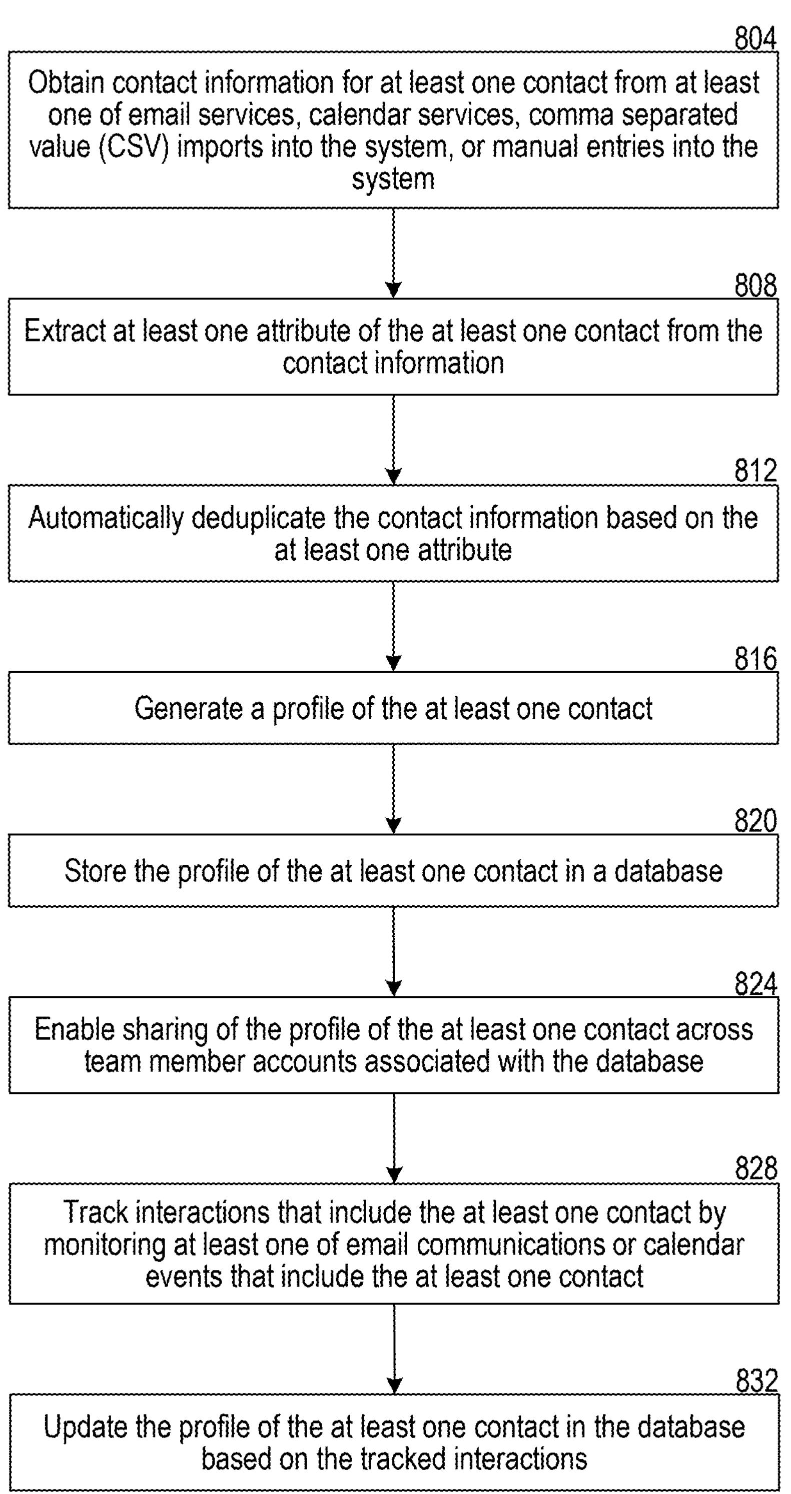
FIG. 8 is a flowchart of a method for integrated contact management.

FIG. 8 is a flowchart of a method for integrated contact management. In some implementations, the process is performed by the system 400 illustrated and described in more detail with reference to FIG. 4. The process can be performed by the computer system 1300 illustrated and described in more detail with reference to FIG. 13. Particular entities, for example, the interface 600 performs some or all of the steps of the process in other implementations. The interface 600 is illustrated and described in more detail with reference to FIG. 6. Likewise, implementations can include different and/or additional steps or can perform the steps in different orders.

At 804, a computer system obtains contact information for contacts from email services, calendar services, comma separated value (CSV) imports into the computer system, or manual entries into the computer system. For example, the contact information is obtained via integration with the email services 442 (illustrated and described in more detail with reference to FIG. 4) to sync contacts, processing of CSV file imports, and/or manual contact entries (e.g., via interface 600). A contacts database module 410 (shown by FIG. 4) can implement contact storage functionality that maintains comprehensive contact profiles with fields such as name and email as well as custom-defined attributes. For email services integration, the system connects using APIs (similar to or the same as the API 128 described in more detail with reference to FIG. 1) to automatically sync contact data in real-time. When importing contacts via CSV, the system processes the structured data files to extract and store contact information. The interface 600 can further enable manual entry of contacts with fields for attributes such as companies and/or job titles.

In some implementations, the computer system integrates with email and calendar services using APIs that enable real-time data synchronization. The integration module 440 (shown by FIG. 4) implements API connections that communicate between a user application 404, AI tool 1200, and databases while enabling communication with remote server systems. For example, the system connects using APIs to email services 442 to automatically sync contact data and monitor communications in real-time. The calendar integration enables tracking of meetings and events using API connections that sync calendar data. Future integrations with third-party tools are supported using APIs, including sales automation platforms, AI-driven enrichment tools, and/or communication services.

At 808, the computer system extracts attributes of the contacts from the contact information. The attributes can include a name of a contact, an email address of a contact, a company that a contact is associated with, a job title of a contact, or a custom field. A database 612 can be configured to store comprehensive contact profiles with standard fields including names, email addresses, companies, job titles, and/or custom-defined attributes. The contacts database module 410 maintains these attributes while enabling flexible organization using custom fields that users can define.

The computer system can link contacts to associated items using the block data model, where blocks are dynamic units of information that can reference other blocks using content arrays. Contacts can be connected to other objects like tasks, electronic communications, and notes through the database structure that preserves relationships between linked items. The database implements contact storage functionality that preserves relationships between linked items. For deduplication, the system can identify and merge duplicate contacts by using email addresses as unique identifiers. For example, when a contact appears with different email addresses, the system can detect these entries as belonging to the same contact based on the email identifiers and suggest potential duplicates for manual merging via the interface. The database enables secure sharing of contacts across team members using permission-based access controls and secure data transmission protocols. Team members can sync contacts across a workspace to ensure everyone has access to up-to-date information while maintaining appropriate security boundaries.

In some implementations, the database is stored using a block data model (shown by FIGS. 1 and 3), in which blocks are dynamic units of information that can be transformed and moved across workspaces. Each block contains attributes including a unique identifier (ID), properties containing custom attributes, and a type that defines how the block is displayed and interpreted. The blocks can be infinitely nested inside other blocks using content arrays that store block IDs referencing nested blocks. For example, the content attribute of a block stores an array of block IDs pointing to nested blocks, enabling hierarchical organization.

At 812, the computer system automatically deduplicates the contact information based on the attributes. The computer system can use email addresses as unique identifiers to detect duplicate contacts and automatically merge them when the same contact appears with multiple email addresses. The computer system can automatically identify and merge duplicate contacts such that each contact appears only once in the unified database. Further, an activity tracking module 430 (shown by FIG. 4) can maintain a chronological timeline of interactions with the contacts by automatically logging email correspondence and updating contact profiles based on observed patterns.

At 816, the computer system generates profiles of the contacts; a profile includes at least one attribute. Contact profiles store multiple attributes including standard fields such as name, email address, company, job title, and custom-defined fields. The contact attributes component maintains these profiles in a database while enabling organization through user-defined custom fields. The database implements contact storage functionality that preserves relationships between linked items, allowing contacts to be connected to other objects like tasks, electronic communications, and notes. Contact profiles are updated based on monitored interactions by maintaining contact records that reflect recent communication patterns. When email interactions or calendar events are tracked, the activity tracking module analyzes the communication data to update profile attributes including interaction frequency, response times, and/or engagement metrics. The system stores the tracked activities chronologically while automatically refreshing contact information based on observed patterns.

In some implementations, the computer system determines a frequency of tracked interactions and generates a relationship status for the contacts based on the frequency. The contacts can be prioritized based on the relationship status. Interaction frequency can be determined by tracking metrics like number of electronic communications exchanged and meeting attendance through API integrations. The activity tracking module analyzes communication patterns including email volume, response times, and meeting participation to calculate interaction frequency. Based on the analyzed frequency, the system generates relationship status by inferring engagement levels from communication cadence and response times. The relationship status represents the strength and engagement level of connections between contacts, determined by analyzing patterns including email exchanges, meeting participation, and interaction frequency. The system prioritizes contacts based on relationship status by analyzing interaction patterns to identify which contacts require attention.

In some implementations, updates to the database include modifying "Last contacted" timestamps based on tracked communications and inferring relationship status from interaction frequency. Using the block data model (shown by FIGS. 1 and 3), each interaction can be stored as a block with properties that can update the associated contact's profile attributes. The system preserves these profile updates while enabling secure sharing across team members using permission-based access controls that maintain appropriate security boundaries. In some implementations, the system links contacts to associated items using the block data model in which blocks contain information as dynamic units that can reference other blocks using the content arrays. Further, the generated interface can enable adding comments and tags on email threads while preserving connections between linked items using the block structure. For example, the database maintains connections by storing blocks in a hierarchical organization. Email threads can be linked to contacts using block references.

At 820, the computer system stores profiles of contacts in a database. For example, the contact profiles are stored in a centralized database that maintains information accessible across teams. The database implements the block data model, where blocks contain attributes including unique IDs, properties, and types that define how information is displayed and interpreted. Contact profiles are stored with multiple attributes while enabling secure sharing across team members using permission-based access controls. The database preserves relationships between linked items using parent-child block hierarchies and integrates with email and calendar services for real-time synchronization. The storage architecture ensures scalability and flexibility while maintaining data integrity across system components.

In some implementations, the computer system implements permission controls for access to the profile of the at least one contact by team member accounts. Permission controls can be implemented using the hierarchical block model, in which blocks inherit permissions from their parent blocks. Each block can have a parent attribute that defines permissions inheritance, enabling granular access control for contact information and communication data. The system can maintain appropriate security boundaries using permission-based access controls that determine which team members can view or edit contact information. For team collaboration, the system can enable secure sharing of contacts across team members while preserving data privacy. For examples, administrators can control which team members have access to contact information and/or activity history (shown by FIG. 6). The permission system can use upward parent pointers to implement permission checks by looking up the ancestor path to the workspace root. Permissions can be modified independently for child blocks while maintaining inheritance from parent blocks.

At 824, the computer system enables sharing of the profiles of the contacts across team member accounts associated with the database. Team members can sync and share contacts across a workspace, ensuring they have access to up-to-date contact information while maintaining appropriate security boundaries. The team sharing component implements permission-based access controls that allow administrators to determine which team members can view or edit specific contact information. Team members can collaborate by viewing chronological activity feeds, adding comments and tags, while the system preserves data privacy using granular permission controls.

At 828, the computer system tracks interactions that include the contacts by monitoring email communications and/or calendar events that include the contacts. An activity tracking module can monitor email communications and calendar events through integration with email and calendar services. Sent and received electronic communications are logged, response times can be tracked, and engagement metrics can be generated while monitoring calendar events, meetings, and attendance. A chronological activity feed can display all monitored interactions, including email correspondence and calendar events organized by contact.

In some implementations, an AI system provides follow-up suggestions based on communication patterns, interaction frequency, and engagement metrics. For example, email threads and communications are monitored, and follow-up drafts are generated when responses are pending, with users able to approve or modify the suggested follow-ups. An "autopilot" feature can be implemented that generates follow-up drafts based on communication history and context. Further, outreach campaigns can be implemented using an AI system that analyze communication patterns to determine timing and messaging.

At 832, the computer system updates contact profiles based on monitored email interactions and calendar events tracked through the activity tracking module. When interactions are logged, the activity tracking module analyzes the communication data to update profile attributes including interaction frequency, response times, and engagement metrics. The computer system stores tracked activities chronologically while automatically refreshing contact information based on observed patterns, including modifying "Last contacted" timestamps and inferring relationship status from interaction frequency. Using the block data model, each interaction is stored as a block with properties that can update the associated contact's profile attributes while preserving these updates through secure sharing across team members.

Figure 9:
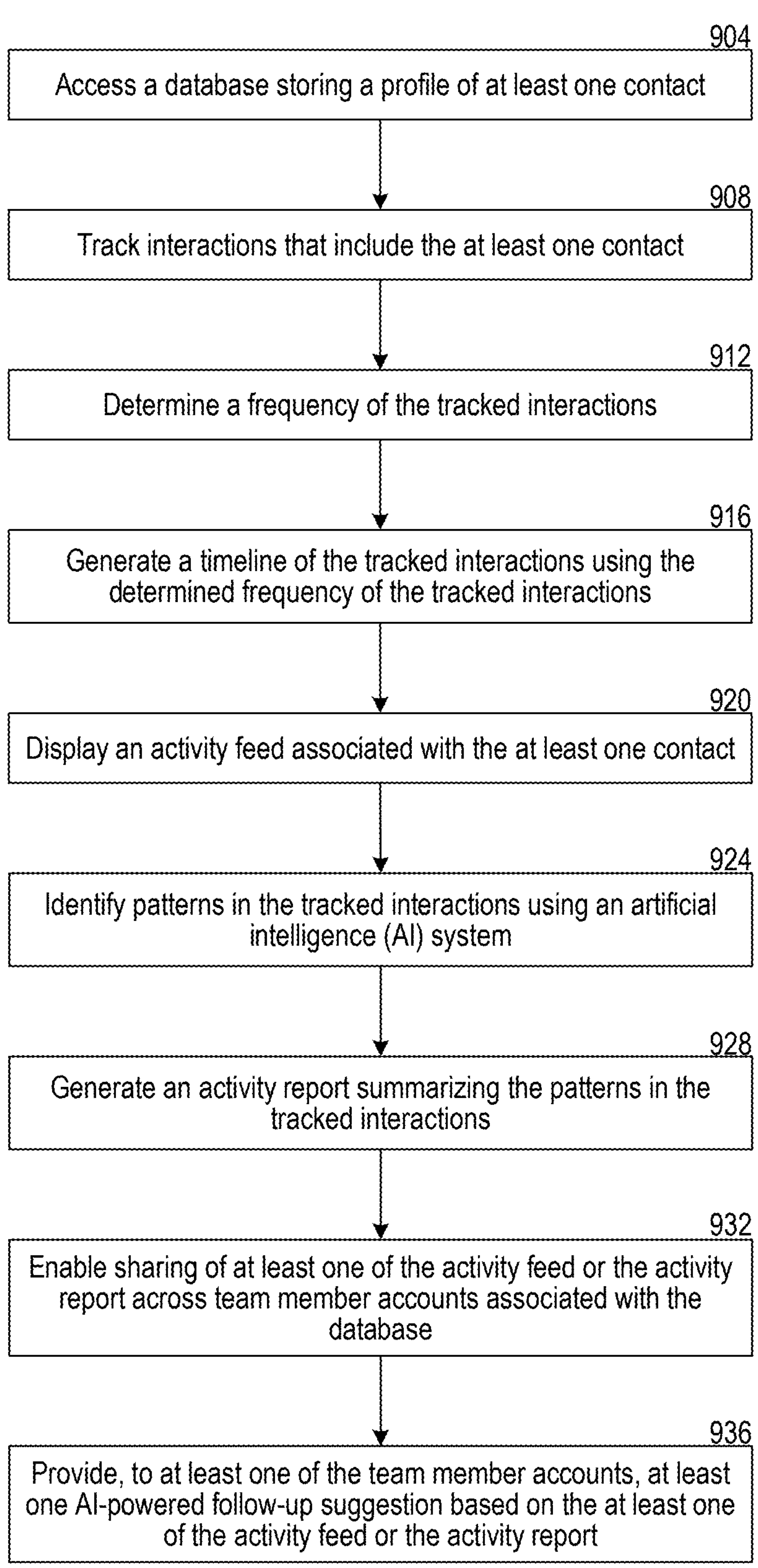
FIG. 9 is a flowchart of a method for activity tracking.

FIG. 9 is a flowchart of a method for activity tracking. In some implementations, the process is performed by the system 400 illustrated and described in more detail with reference to FIG. 4. The process can be performed by the computer system 1300 illustrated and described in more detail with reference to FIG. 13. Particular entities, for example, the interface 600 performs some or all of the steps of the process in other implementations. The interface 600 is illustrated and described in more detail with reference to FIG. 6. Likewise, implementations can include different and/or additional steps or can perform the steps in different orders.

At 904, a computer system accesses a database storing profiles of contacts. The database is integrated with email services, calendar services, or CSV imports. The computer system can monitor interactions by integrating with email services 442 (illustrated and described in more detail with reference to FIG. 4) to log messages in real-time using API connections. For example, the activity tracking module 430 (shown by FIG. 4) logs correspondence, tracks response times, and generates engagement metrics. The computer system can also integrate with calendar services using APIs (similar to or the same as the API 128 described in more detail with reference to FIG. 1) to monitor meetings and events. Calendar integration enables real-time synchronization of meeting data including logging attendance and updating contact profiles based on calendar interactions.

At 908, the computer system tracks interactions that include the contacts by logging email communications sent and received by the email services. The computer system can log calendar events sent and received by the calendar services. A relationship status 438 (shown by FIG. 4) with a contact can be determined by analyzing communication patterns using the activity tracking module 430. The relationship status is determined based on metrics such as communication cadence and response times to identify engagement levels. For example, relationship strength is determined based on interaction frequency using metrics such as a number of electronic communications exchanged and/or meeting attendance. Interaction frequency can be used to generate relationship insights, analyze communication trends, and determine relationship strength.

At 912, the computer system determines a frequency of the tracked interactions. For example, interaction frequency is determined by monitoring email communications and calendar events to track how often users interact with contacts. Contacts can be sorted by interaction count from high to low to identify which contacts have more frequent communications. Time dimensions are added to understand periods between interactions, with periodic database queries generating automated recommendations based on the tracked frequency patterns.

In some implementations, an activity feed 652 (shown by FIG. 6) is generated, which displays a chronological timeline view of interactions. The interface 600 displays email threads and calendar events organized by contact, with timestamps indicating interaction dates and frequency. The activity feed 652 can implement the block data model (shown by FIGS. 1 and 3), in which each activity is stored as a block containing properties about the communication, enabling features such as commenting and tagging. The block data model enables chronological organization using creation dates. For filtering, the interface 600 organizes the activity feed 652 by interaction type, allowing users to view email threads and calendar meetings separately. The timelines display filtered views of communication patterns while preserving relationships between linked interactions using the block structure. Users can add comments and tags on email threads while preserving annotations using the hierarchical block structure.

At 916, the computer system generates a timeline of the tracked interactions using the determined frequency of the tracked interactions. A chronological timeline of interactions is generated by automatically logging email correspondence, meetings, and engagement data organized by contact. The timeline chronologically organizes monitored interactions while enabling secure sharing across team members.

In some implementations, secure sharing of interaction history is enabled using permission-based access controls implemented via the hierarchical block model. Team members can access shared contact information and communication timelines while maintaining appropriate security boundaries using the permissions inherited from parent blocks. For example, the interface 600 displays "Last contacted" timestamps and relationship status indicators that are visible to team members that have proper permissions. Team members can view chronological activity feeds showing email correspondence and calendar events while adding comments and tags on activity items.

At 920, the computer system displays an activity feed associated with the contacts. The activity feed is generated using the timeline of the tracked interactions. The activity feed displays a chronological timeline showing email correspondence, meetings, and engagement data organized by contact. The activity feed can include communications and events related to specific contacts, enabling quick visibility into relationship status. The activity tracking module automatically logs interactions while maintaining a comprehensive feed that shows email threads with creation dates and calendar events.

In some implementations, the activity tracking module enables filtering interactions by type, displaying email threads and calendar meetings separately in the chronological activity feed. Interactions are organized by interaction type while preserving relationships between linked interactions using the block structure. Users can add comments and tags on email threads while preserving annotations using the hierarchical block structure. The system enables team collaboration by allowing users to tag team members in comments on specific threads and add contextual notes, with the block data model maintaining these annotations.

In some implementations, the activity feed is implemented using the block data model, where each block represents a singular unit of information like electronic communications, calendar events, and interactions. Each block contains attributes including a unique ID, properties storing interaction data, and a type defining how the block is displayed. The system enables commenting and tagging on blocks while maintaining security through hierarchical permissions, where blocks inherit permissions from parent blocks via upward pointers. The parent attribute defines permissions inheritance, enabling granular access control for interaction data. Teams can add comments and tags on activity items while the system maintains secure access controls through permission-based boundaries that determine which team members can view or edit specific blocks.

At 924, the computer system identifies patterns in the tracked interactions using an artificial intelligence (AI) system. For example, the AI system analyzes communication patterns using a transformer-based neural network architecture to identify interaction trends and engagement levels. The AI system can process historical interaction data through multiple neural network layers while considering metrics like response times and engagement. Using machine learning algorithms, the AI system can analyze activity patterns to determine relationship strength based on email volume and meeting attendance.

At 928, the computer system generates an activity report 452 (shown by FIG. 4) based on communication patterns using the activity tracking module 430. The reporting module 450 (shown by FIG. 4) provides insights based on activity patterns and relationship trends across contacts. The activity reports 452 summarize communication patterns, visualize relationship trends, and provide insights into engagement levels. The interface 600 displays the activity reports 452 showing patterns in monitored interactions, including which contacts have the most interaction and which relationships require attention. These patterns can be analyzed to generate relationship insights, determine relationship strength, and identify potential transactions. The reporting functionality enables teams to track progress through visual pipeline views.

At 932, the computer system enables sharing of the activity feed and/or the activity report across team member accounts associated with the database. Sharing is enabled using permission-based access controls and hierarchical block relationships. Team members can view chronological activity feeds showing email correspondence, calendar events, and communication patterns while maintaining appropriate security boundaries. Administrators can control which team members can access specific contact information and activity history using granular permission controls that determine viewing and editing rights.

At 936, the computer system uses an AI system to generate follow-up suggestions based on the activity feed and/or the activity report. The follow-up suggestions are based on the communication patterns and interaction history displayed in the activity feed. Using a transformer-based neural network, the AI system can process interaction metrics to generate contextual recommendations, such as automatically suggesting follow-ups when responses are pending. The system can implement an "autopilot" feature that analyzes thread context and communication history to generate contextually-appropriate follow-up suggestions based on monitored interaction patterns. The AI model can automatically detect when follow-ups would be beneficial based on relationship status and engagement levels shown in the activity reports.

The AI system provides recommended follow-up timing by analyzing communication patterns and historical interaction data through its transformer-based neural network. The "autopilot" feature analyzes thread context to generate contextually-appropriate timing suggestions, such as following up after 3-4 days when responses are pending. The system recommends actions to improve relationship status by analyzing interaction patterns and automatically identifies when follow-ups would be beneficial based on relationship status and engagement levels. The AI model processes historical data to determine optimal follow-up timing while providing suggestions for improving inactive relationships.

In some implementations, a pipeline management module tracks transactions by associating them with specific contacts in the database, displaying key metrics like transaction status, value, and progress through visual pipeline views organized by stage. A pipeline interface can be implemented that visualizes transaction status and progress while integrating with task management functions to coordinate relationship-building efforts. Monitored interactions can be linked to pipeline stages, enabling teams to track how transactions advance through different stages while maintaining relationships between communications and pipeline status.

In some implementations, importance values are determined by analyzing communication patterns including email volume, meeting attendance, and response times using the activity tracking module. The system can sort contacts by importance values from high to low, enabling prioritization based on communication patterns. The interface displays relationship status indicators and engagement metrics while automatically identifying high-priority threads that require attention based on email content and interaction patterns.

Figure 10:
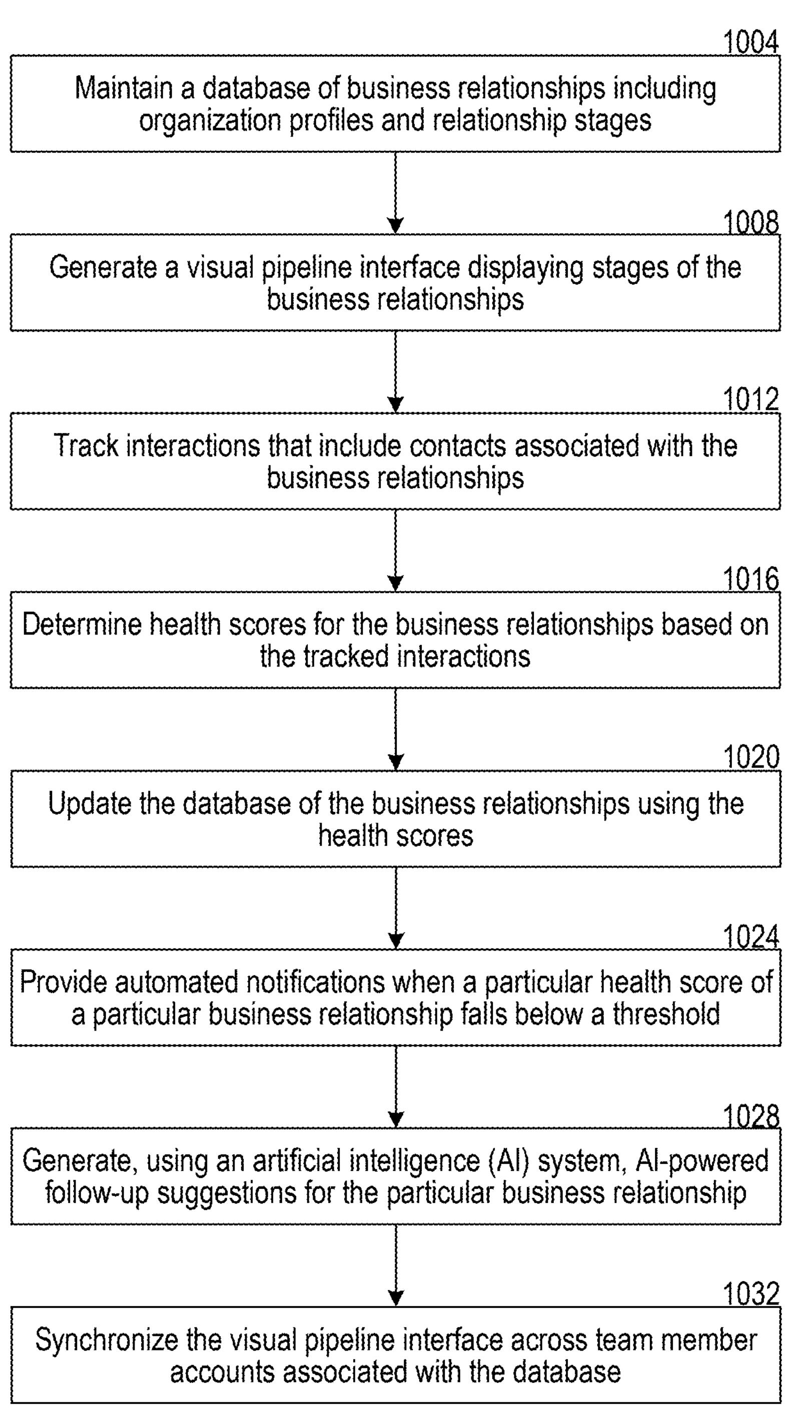
FIG. 10 is a flowchart of a method for relationship management and tracking.

FIG. 10 is a flowchart of a method for relationship management and tracking. In some implementations, the process is performed by the system 400 illustrated and described in more detail with reference to FIG. 4. The process can be performed by the computer system 1300 illustrated and described in more detail with reference to FIG. 12. Particular entities, for example, the interface 600 performs some or all of the steps of the process in other implementations. The interface 600 is illustrated and described in more detail with reference to FIG. 6. Likewise, implementations can include different and/or additional steps or can perform the steps in different orders.

At 1004, a computer system maintains a database that stores comprehensive contact profiles with standard fields including names, email addresses, companies, job titles, and custom-defined attributes. The contacts database module implements contact storage functionality that preserves relationships between linked items while enabling flexible organization. The system automatically syncs and deduplicates contacts from various sources including email services, CSV imports, and manual entries into a single unified list. Organization profiles are stored using a block data model where each block contains attributes including a unique ID, properties storing relationship data, and type definitions for display.

At 1008, the computer system generates a visual pipeline interface (shown by FIG. 11) displaying stages of transactions associated with the contacts. The pipeline interface is generated using the pipeline management module 460 (shown by FIG. 4), which tracks transactions by associating transactions with specific contacts in the database 612 (shown by FIG. 6). The interface 600 can display key metrics including transaction status, value, and progress through visual pipeline views organized by stage. The pipeline management functionality integrates with task management functions while enabling teams to coordinate relationship-building efforts using shared access to pipeline data. For example, the system generates multiple pipeline stages by implementing a database structure that tracks transactions through different stages of progress.

The pipeline stages enable tracking transactions by maintaining relationships between contacts and associated transactions using the block data model illustrated and described in more detail with reference to FIGS. 1 and 3. Each stage can store properties about transaction status, progress metrics, and relationship to specific contacts while preserving connections using parent-child block hierarchies. Teams can track comprehensive timelines showing how transactions progress through stages while maintaining data privacy using permission-based access controls inherited via parent block attributes. A visual pipeline interface (similar to the interface 700 illustrated and described in more detail with reference to FIG. 7) is integrated with activity tracking functionality to provide a unified view of relationships and transactions.

In some implementations, transactions are associated with contacts using the pipeline management module 460. For example, the interface 600 associates transactions with contacts while maintaining relationships using the block data model where each transaction block contains properties referencing related contact blocks. To track progress, transactions are monitored through visual pipeline views that display status transitions and advancement through different stages. The pipeline management functionality maintains timelines showing how transactions progress while integrating with task management functions to coordinate relationship-building efforts. Further, transaction values and probability metrics can be stored as properties within transaction blocks in the database 612. The visual pipeline interface displays key metrics including transaction status, value, and progress through visual pipeline views organized by stage. The interface enables tracking transaction values and probability estimates while preserving relationships between transactions and contacts using parent-child block hierarchies.

At 1012, the computer system monitors email communications and calendar events by logging sent/received messages while tracking response times and engagement metrics. The system integrates with email and calendar services using APIs to enable real-time synchronization of interactions. The email tracking component automatically logs email exchanges and monitors response times, while the calendar tracking component integrates with calendar services to track meetings, events, and attendance. The activity tracking functionality updates contact profiles based on the monitored interactions.

At 1016, the computer system determine health scores for the relationships based on the tracked interactions and the stages of the transactions. Relationship health scores are determined by analyzing communication patterns including frequency, recency, and sentiment of communications. Relationship stage positions can be updated within the pipeline interface based on the calculated health scores. Health scores are used to trigger automated notifications when relationships require attention, with an AI system providing follow-up suggestions when particular health scores fall below thresholds. The pipeline management module integrates the health scoring with transaction tracking by analyzing historical relationship progression patterns while monitoring changes in transaction status and pipeline stages.

At 1020, the computer system dynamically updates the database by determining relationship health scores based on analyzing communication patterns including frequency, recency, and sentiment of communications. The system uses health scores to trigger automated notifications and dynamically update relationship stage positions within the pipeline interface. The database is continuously updated through real-time synchronization as the system monitors interaction metrics and calculates new health scores, enabling automatic updates to relationship status and engagement levels.

At 1024, the computer system provides automated notifications when relationship health scores of a particular relationship fall below defined thresholds based on analyzing communication patterns including frequency, recency, and sentiment. The activity tracking module monitors interaction metrics and triggers alerts when engagement levels decline below predetermined values. The system automatically identifies inactive relationships requiring attention and sends notifications based on periods of communication inactivity exceeding threshold values.

At 1028, an AI system is used to generate follow-up suggestions for the particular relationship based on interaction frequency, response times, and engagement metrics. The AI system identifies when follow-ups would be beneficial based on the relationship status and engagement levels. The "autopilot" feature can generate contextual follow-up drafts based on the communication history and thread context. Users can approve or modify the suggested follow-ups, with the system providing recommendations on timing.

The system can generate a relationship status 438 (shown by FIG. 4) based on interaction frequency, response times, and engagement metrics. For example, communication patterns are analyzed to infer the relationship status based on communication cadence and response times. The interaction frequency is determined by tracking metrics such as a number of electronic communications exchanged and meeting attendance using API integrations. The activity tracking module 430 (shown by FIG. 4) uses the interaction data to generate relationship insights, analyze communication trends, and measure relationship status. In embodiments, an AI system identifies inactive relationships based on communication frequency metrics and provides suggestions for improving the relationship status.

At 1032, the computer system synchronizes the visual pipeline interface across team members using WebSocket connections that enable real-time updates. A MessageStore service can be used for managing synchronized data updates, with the SaveTransactions process persisting changes across team accounts. When changes occur, MessageStore finds client connections subscribed to those records and passes updates through WebSocket connections, enabling instantaneous synchronization of pipeline views.

A team collaboration interface can be implemented using a block data model where interaction history is displayed using visual timelines showing email correspondence and calendar events organized by contact. For example, the team collaboration interface enables teams to view activity feeds showing communication patterns while maintaining appropriate security boundaries. The visualization displays chronological timelines of interactions, with timestamps indicating interaction dates and frequency. For permission controls, the system can implement the hierarchical block model. Administrators can control which team members have access to contact information and activity history, ensuring sensitive data is only shared with appropriate team members. The permission system uses parent pointers to efficiently implement permission checks by looking up the ancestor path to determine access rights.

In some implementations, custom fields are generated using the block data model, which each contact block can store custom-defined attributes for relationship tracking. The interface 600 enables creating custom fields in the visualization by adding properties to blocks that store relationship metrics, interaction data, and engagement levels. Users can also create custom fields and properties while preserving relationships using parent-child block hierarchies. Contacts can be categorized by relationship type in the database structure. The interface 600 enables organizing contacts based on relationship status, engagement levels, and custom-defined categories. Organizational structures are preserved using the block model, in which contact blocks inherit permissions from parent blocks.

Transactions can be linked using relationships between transaction blocks and contact blocks in the database 612. For example, the visual pipeline interface enables associating transactions with specific contacts while preserving connections using parent-child block hierarchies. Teams can track how transactions relate to contacts using the shared access to pipeline data while maintaining data privacy using permission-based access controls inherited via parent block attributes. The visual pipeline interface provides a unified view of relationships by linking transactions to contacts using the block structure.

In some implementations, the visual pipeline interface renders timeline views using the block data model, enabling real-time updates via WebSocket connections. For example, when a client renders content, it subscribes to changes through a WebSocket connection to MessageStore for instantaneous updates. Timeline data can be loaded using loadPageChunk API that traverses a block tree to find dependencies. The visual pipeline interface can display chronological email threads and synchronized calendar events, with MessageStore pushing updates to subscribed clients using WebSocket connections. A saveTransactions process can notify the MessageStore of updates, which pushes changes to clients. The system 400 maintains consistency by verifying block versions and requesting updates through a syncRecordValues API, enabling real-time re-rendering while preserving security using permission controls.

In some implementations, the system 400 generates relationship management blocks, where each block contains attributes including an ID, type defining relationship visualization, and properties storing interaction metrics. For example, the relationship blocks track interaction frequency, communication patterns, and relationship status. The system 400 can analyze the communication patterns to determine relationship strength based on email volume and meeting attendance. The system 400 can also use an AI system to generate suggestions by analyzing block properties using a transformer-based neural network (shown by FIG. 2). For example, the AI model 1130 (shown by FIG. 11) processes interaction metrics to determine follow-ups, with the "autopilot" feature generating contextual recommendations.

Figure 11:
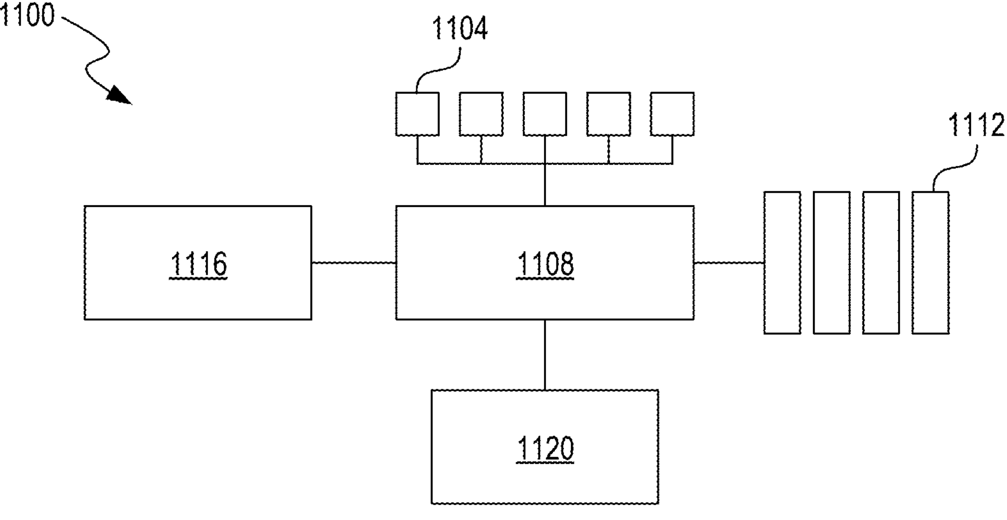
FIG. 11 is a block diagram illustrating a system for relationship management and pipeline tracking.

FIG. 11 is a block diagram illustrating a system 1100 for relationship management and pipeline tracking. The team member accounts 1104 shown by FIG. 11 manage individual user profiles and access permissions, while the database 1108 stores and retrieves necessary data. The visual pipeline interface 1112 enhances usability and productivity through user-friendly graphical workflows. Integrated email services 1116 facilitate team communication, and calendar services 1120 manage events and deadlines. The components of the system 1100 streamline operations and fosters team collaboration. Furthermore, the AI model 1230 (shown by FIG. 12) processes interaction metrics for follow-ups, enhancing the relationship management functionalities. Each part of system 1100 systematically integrates to maintain data integrity, provide real-time updates, and secure access controls, making system 1100 a comprehensive solution for tracking and managing relationships and transactions.

In some implementations, the system 1100 provides centralized management of relationships and interaction tracking (electronic communications, meetings, tasks) by integrating with email services 1116. The contacts can be organized by relationship type, such as client, vendor, colleague, or friend. The system 1100 can automatically monitor email communications, logging sent and received messages while tracking response times and engagement metrics. The database 1108, which is implemented by a computer program is configured to store contact information, including a name, an email address, a company name, a job title, a phone number, a relationship type, a communication history, and custom fields that are specific to a relationship. The communication history can include email correspondence, calendar events, meeting notes, and tasks associated with the contact, enabling a user to track all interactions with each contact in a central location. The database 1108 is connected to the team member accounts 1104.

The blocks in the system 1100 are implemented using the block data model, in which blocks are dynamic units of information that can be transformed and moved across workspaces. Each block can contain attributes, including a unique identifier (ID), properties containing custom attributes, and a type defining how the block is displayed and interpreted. The blocks can be infinitely nested inside other blocks using content arrays storing block IDs referencing nested blocks, enabling hierarchical organization. For example, the content attribute of a block stores an array of block IDs pointing to nested blocks.

In some implementations, the system 1100 monitors email communications and logs sent and received messages while tracking response times and engagement metrics, thus maintaining a chronological timeline of interactions. The tracked interactions are used to update the communication history associated with each contact, providing a comprehensive record of interactions over time. A relationship management module can be implemented that determines relationship health scores based on factors such as the frequency of communication, the recency of interactions, and the type of interactions. The relationship management module can use an AI system to generate suggestions to improve relationships by analyzing communication patterns and recommending actions. The relationship management module can be implemented using machine learning algorithms, such as clustering algorithms or classification models, trained on a dataset of communication patterns and relationship outcomes. By analyzing the communication history of contacts, the relationship management module can identify patterns and trends that indicate the strength and health of relationships, allowing users to prioritize their interactions and focus on building and maintaining strong relationships.

In some implementations, a reporting and analytics module generates reports on communication patterns and relationship health scores, providing insights into the overall state of relationships. The reporting and analytics module can leverage data visualization tools to present the information in a clear and concise manner, making it easier for users to identify trends, patterns, and areas for improvement in their relationship management efforts. For instance, the reporting and analytics module can generate reports that show the distribution of relationship health scores across different contact segments, helping users to identify which groups of contacts require more attention.

Customizable pipeline views can be generated based on user-defined relationship parameters and health scores. The pipeline management module can update relationship stage positions within the visual interface 1112 based on health scores that analyze communication patterns, frequency, and engagement metrics. The interface 1112 provides visual representations of transactions organized by stages while enabling drag-and-drop functionality for manually adjusting relationship stages. The system automatically updates the visual pipeline interface 1112 when health scores change, with the visual pipeline interface 1112 displaying relationship strength indicators and engagement levels through visual pipeline views. The pipeline analytics component provides visual representations of transactions and opportunities, enabling tracking progress through different pipeline stages while monitoring changes in status based on health scores.

In some implementations, an integration module syncs data with external services, such as email services 1116 and calendar services 1120, providing that contact information and communication history are kept up to date. The integration module can be implemented using APIs provided by external services, which allow the system 1100 to access and retrieve data from these services. For instance, the integration module can connect to a user's account and retrieve the latest electronic communications, events, and contacts, updating the system's database with the new information.

For relationship management, the system 1100 can provide an interface, which can include multiple views or sections, each of which is dedicated to a specific aspect of relationship management, such as activity tracking and relationship analytics. The activity tracking view can provide a chronological timeline of interactions with each contact, including electronic communications, meetings, calls, and notes. The relationship analytics view can provide insights into the health and strength of relationships based on various metrics, such as communication frequency, response times, and engagement levels. Users can view relationship health scores for individual contacts, as well as for groups of contacts, such as clients, vendors, or colleagues.

The system 1100 is also caused to automatically assign a health score to each relationship in the database 1108 based on the communication history. The health score is a numerical value that represents the strength and quality of the relationship, and it can be used to identify relationships that need attention. The health score can be determined using a variety of factors, including the frequency of communication, the recency of interactions, the sentiment of the communications, and the responsiveness of the contact. For example, a relationship with a high frequency of positive communication and quick response times would receive a high health score, while a relationship with infrequent communication and negative sentiment would receive a low health score. The system 1100 can use the health score to generate insights and recommendations for managing relationships. For instance, the system can identify contacts with low health scores and suggest actions to improve the relationship, such as sending a follow-up electronic communications, scheduling a meeting, or providing personalized content.

In some implementations, the system 1100 stores multiple blocks containing transactions, maintaining hierarchical relationships between the blocks using parent attributes that define permissions inheritance. These blocks can represent different stages in the sales process, such as prospecting, qualifying, proposing, closing, and won. Each block can contain information specific to the corresponding stage, such as the transaction value, the probability of closing, and the next steps. The hierarchical relationships between the blocks allow users to track the progress of transactions through the visual pipeline interface 1112 and to understand the dependencies between different stages. The permissions inheritance ensures that sensitive information is only accessible to authorized users based on their role and level of access.

The system 1100 can generate relationship management blocks for tracking the interactions, where each relationship management block includes attributes describing a frequency of the tracked interactions and the health scores. These blocks can represent individual interactions, such as electronic communications, meetings, calls, or social media messages, or they can represent aggregated interactions over a period of time. The attributes of the blocks can include timestamps, sender and recipient information, communication channels, sentiment scores, and engagement metrics. The system 1100 can use these blocks to provide a detailed view of the communication patterns and relationship dynamics between contacts. It can also use the attributes to generate reports, visualizations, and insights to help users manage their relationships more effectively.

An AI system can generate follow-up suggestions based on the attributes of the relationship management blocks. The follow-up suggestions can include a recommended follow-up timing, such as a recommended time to send an electronic communication or schedule a meeting, or it can include recommended follow-up content, such as a personalized message or a relevant piece of information. The follow-up suggestions can be generated using a variety of machine learning techniques, such as predictive modeling or reinforcement learning, trained on a dataset of communication patterns and relationship outcomes. By analyzing the historical interactions and relationship dynamics, the system 1100 can provide personalized recommendations that are tailored to the specific needs of each relationship.

Figure 12:
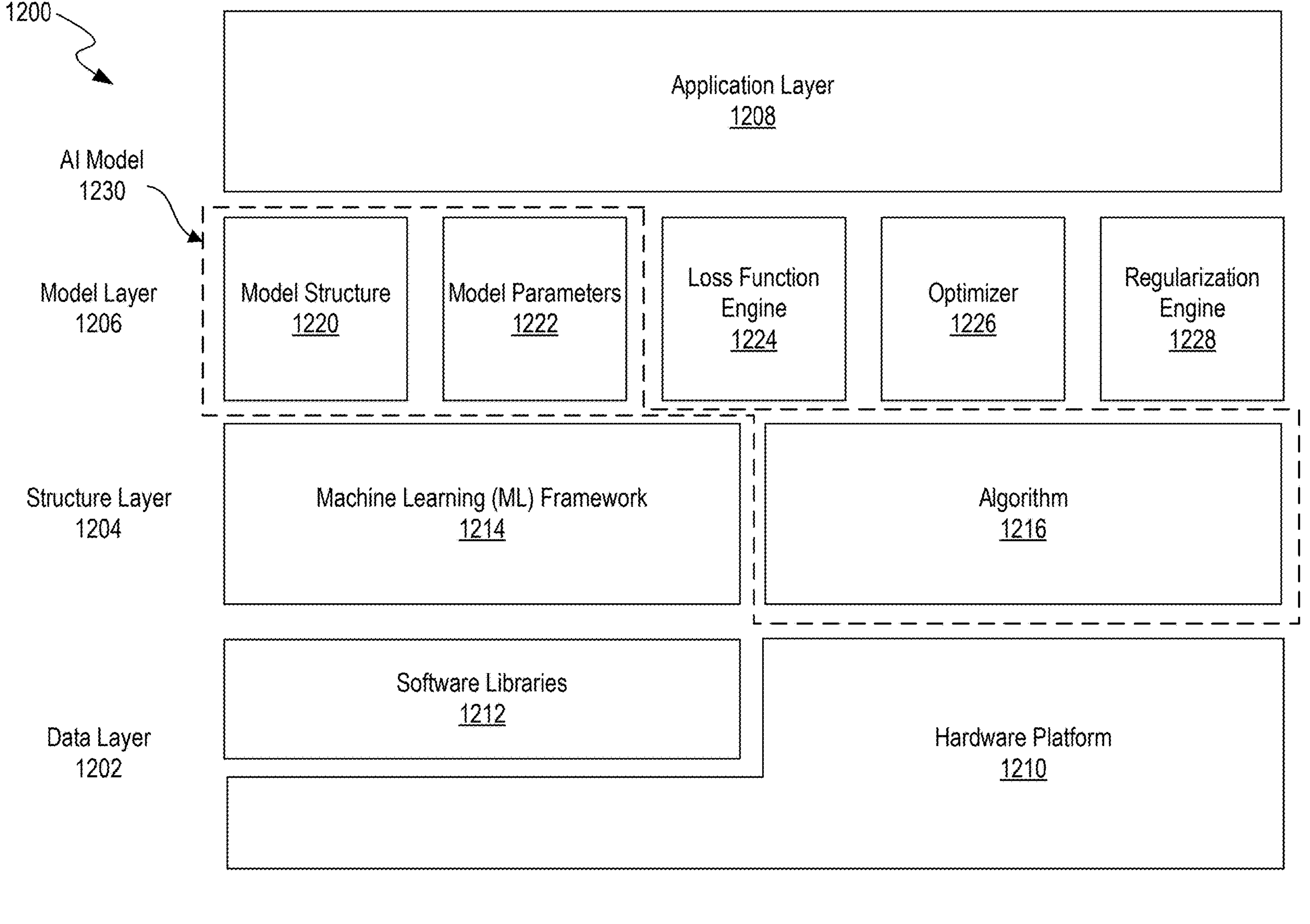
FIG. 12 is a block diagram illustrating an example AI system that can implement aspects of the present technology.

FIG. 12 is a block diagram illustrating an example AI system 1200 that can implement aspects of the present technology. The AI system 1200 is implemented using components of the example computer system 1300 illustrated and described in more detail with reference to FIG. 13. For example, the AI system 1200 can be implemented on the processor 1302 using instructions 1308 programmed in the memory 1306 illustrated and described in more detail with reference to FIG. 13. Likewise, implementations of the AI system 1200 can include different and/or additional components or be connected in different ways. FIG. 12 illustrates a layered architecture of AI system 1200 that can implement the system 400 of FIG. 4, in accordance with some implementations of the present technology.

As shown, the AI system 1200 can include a set of layers, which conceptually organize elements within an example network topology for the AI system's architecture to implement a particular AI model 1230. Generally, an AI model 1230 is a computer-executable program implemented by the AI system 1200 that analyses data to make predictions. Information can pass through each layer of the AI system 1200 to generate outputs for the AI model 1230. The layers can include a data layer 1202, a structure layer 1204, a model layer 1206, and an application layer 1208. The algorithm 1216 of the structure layer 1204 and the model structure 1220 and model parameters 1222 of the model layer 1206 together form an example AI model 1230. The optimizer 1226, loss function engine 1224, and regularization engine 1228 work to refine and optimize the AI model

1230, and the data layer 1202 provides resources and support for application of the AI model 1230 by the application layer 1208.

The data layer 1202 acts as the foundation of the AI system 1200 by preparing data for the AI model 1230. As shown, the data layer 1202 can include two sub-layers: a hardware platform 1210 and one or more software libraries 1212. The hardware platform 1210 can be designed to perform operations for the AI model 1230 and include computing resources for storage, memory, logic and networking, such as the resources described in relation to FIG. 12. The hardware platform 1210 can process amounts of data using one or more servers. The servers can perform backend operations such as matrix calculations, parallel calculations, machine learning (ML) training, and the like. Examples of servers used by the hardware platform 1210 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 1210 can include computing resources, (e.g., servers, memory, etc.) offered by a cloud services provider. The hardware platform 1210 can also include computer memory for storing data about the AI model 1230, application of the AI model 1230, and training data for the AI model 1230. The computer memory can be a form of random-access memory (RAM), such as dynamic RAM, static RAM, and non-volatile RAM.

The software libraries 1212 can be thought of suites of data and programming code, including executables, used to control the computing resources of the hardware platform 1210. The programming code can include low-level primitives (e.g., fundamental language elements) that form the foundation of one or more low-level programming languages, such that servers of the hardware platform 1210 can use the low-level primitives to carry out specific operations. The low-level programming languages do not require much, if any, abstraction from a computing resource's instruction set architecture, allowing them to run quickly with a small memory footprint. Examples of software libraries 1212 that can be included in the AI system 1200 include INTEL Math Kernel Library, NVIDIA cuDNN, EIGEN, and OpenBLAS.

The structure layer 1204 can include an ML framework 1214 and an algorithm 1216. The ML framework 1214 can be thought of as an interface, library, or tool that allows users to build and deploy the AI model 1230. The ML framework 1214 can include an open-source library, an API (similar to or the same as the API 128 described in more detail with reference to FIG. 1), a gradient-boosting library, an ensemble method, and/or a deep learning toolkit that work with the layers of the AI system facilitate development of the AI model 1230. For example, the ML framework 1214 can distribute processes for application or training of the AI model 1230 across multiple resources in the hardware platform 1210. The ML framework 1214 can also include a set of pre-built components that have the functionality to implement and train the AI model 1230 and allow users to use pre-built functions and classes to construct and train the AI model 1230. Thus, the ML framework 1214 can be used to facilitate data engineering, development, hyperparameter tuning, testing, and training for the AI model 1230. Examples of ML frameworks 1214 that can be used in the AI system 1200 include TENSORFLOW, PYTORCH, SCIKIT-LEARN, KERAS, LightGBM, RANDOM FOREST, and AMAZON WEB SERVICES.

The algorithm 1216 can be an organized set of computer-executable operations used to generate output data from a set of input data and can be described using pseudocode. The algorithm 1216 can include complex code that allows the computing resources to learn from new input data (e.g., interactions described in more detail with reference to FIGS. 4-11) and create new/modified outputs based on what was learned. In some implementations, the algorithm 1216 can build the AI model 1230 through being trained while running computing resources of the hardware platform 1210. This training allows the algorithm 1216 to make predictions or decisions without being explicitly programmed to do so. Once trained, the algorithm 1216 can run at the computing resources as part of the AI model 1230 to make predictions or decisions, improve computing resource performance, or perform tasks. The algorithm 1216 can be trained using supervised learning, unsupervised learning, semi-supervised learning, and/or reinforcement learning.

Using supervised learning, the algorithm 1216 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., electronic communications and events) from various source computing systems described in relation to FIG. 4. Furthermore, training data can include pre-processed data generated by various engines of the system 400 described in relation to FIG. 4. The user may label the training data based on one or more classes and trains the AI model 1230 by inputting the training data to the algorithm 1216. The algorithm determines how to label the new data based on the labeled training data. The user can facilitate collection, labeling, and/or input via the ML framework 1214. In some instances, the user may convert the training data to a set of feature vectors for input to the algorithm 1216. Once trained, the user can test the algorithm 1216 on new data to determine if the algorithm 1216 is predicting accurate labels for the new data. For example, the user can use cross-validation methods to test the accuracy of the algorithm 1216 and retrain the algorithm 1216 on new training data if the results of the cross-validation are below an accuracy threshold.

Supervised learning can involve classification and/or regression. Classification techniques involve teaching the algorithm 1216 to identify a category of new observations based on training data and are used when input data for the algorithm 1216 is discrete. Said differently, when learning through classification techniques, the algorithm 1216 receives training data labeled with categories (e.g., classes) and determines how features observed in the training data (e.g., images, text, video clips, audio clips, or social media posts) relate to the categories (e.g., a professional context, a romantic conversation, or an educational context). Once trained, the algorithm 1216 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 1216 is continuous. Regression techniques can be used to train the algorithm 1216 to predict or forecast relationships between variables. To train the algorithm 1216 using regression techniques, a user can select a regression method for estimating the parameters of the model. The user collects and labels training data that is input to the algorithm 1216 such that the algorithm 1216 is trained to understand the relationship between data features and the dependent variable(s). Once trained, the algorithm 1216 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 1216 learns patterns from unlabeled training data. In particular, the algorithm 1216 is trained to learn hidden patterns and insights of input data, which can be used for data exploration or for generating new data. Here, the algorithm 1216 does not have a predefined output, unlike the labels output when the algorithm 1216 is trained using supervised learning. Said another way, unsupervised learning is used to train the algorithm 1216 to find an underlying structure of a set of data, group the data according to similarities, and represent that set of data in a compressed format. The system 400 can use unsupervised learning to identify patterns in digital content history (e.g., to identify communication patterns) and so forth.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 1216 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 1216 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of training on the latent variables and that the observable variables have nothing in common after controlling for the latent variables. Examples of latent variable techniques that may be used by the algorithm 1216 include factor analysis, item response theory, latent profile analysis, and latent class analysis.

The model layer 1206 implements the AI model 1230 using data from the data layer and the algorithm 1216 and ML framework 1214 from the structure layer 1204, thus enabling decision-making capabilities of the AI system 1200. The model layer 1206 includes a model structure 1220, model parameters 1222, a loss function engine 1224, an optimizer 1226, and a regularization engine 1228.

The model structure 1220 describes the architecture of the AI model 1230 of the AI system 1200. The model structure 1220 defines the complexity of the pattern/relationship that the AI model 1230 expresses. Examples of structures that can be used as the model structure 1220 include decision trees, support vector machines, regression analyses, Bayesian networks, Gaussian processes, genetic algorithms, and artificial neural networks (or, simply, neural networks). The model structure 1220 can include a number of structure layers, a number of nodes (or neurons) at each structure layer, and activation functions of each node. Each node's activation function defines how a node converts data received to data output. The structure layers may include an input layer of nodes that receive input data, an output layer of nodes that produce output data. The model structure 1220 may include one or more hidden layers of nodes between the input and output layers. The model structure 1220 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 1222 represent the relationships learned during training and can be used to make predictions and decisions based on input data. The model parameters 1222 can weight and bias the nodes and connections of the model structure 1220. For instance, when the model structure 1220 is a neural network, the model parameters 1222 can weight and bias the nodes in each layer of the neural networks, such that the weights determine the strength of the nodes and the biases determine the thresholds for the activation functions of each node. The model parameters 1222, in conjunction with the activation functions of the nodes, determine how input data is transformed into desired outputs. The model parameters 1222 can be determined and/or altered during training of the algorithm 1216.

The loss function engine 1224 can determine a loss function, which is a metric used to evaluate the AI model's performance during training. For instance, the loss function engine 1224 can measure the difference between a predicted output of the AI model 1230 and the actual output of the AI model 1230 and is used to guide optimization of the AI model 1230 during training to minimize the loss function. The loss function may be presented via the ML framework 1214, such that a user can determine whether to retrain or otherwise alter the algorithm 1216 if the loss function is over a threshold. In some instances, the algorithm 1216 can be retrained automatically if the loss function is greater than the threshold. Examples of loss functions include a binary-cross entropy function, hinge loss function, regression loss function (e.g., mean square error, or quadratic loss), mean absolute error function, smooth mean absolute error function, log-cosh loss function, and quantile loss function.

The optimizer 1226 adjusts the model parameters 1222 to minimize the loss function during training of the algorithm 1216. In other words, the optimizer 1226 uses the loss function generated by the loss function engine 1224 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 1226 used may be determined based on the type of model structure 1220 and the size of data and the computing resources available in the data layer 1202.

The regularization engine 1228 executes regularization operations. Regularization is a technique that prevents over- and under-fitting of the AI model 1230. Overfitting occurs when the algorithm 1216 is overly complex and too adapted to the training data, which can result in poor performance of the AI model 1230. Underfitting occurs when the algorithm 1216 is unable to recognize even basic patterns from the training data such that it cannot perform well on training data or on validation data. The optimizer 1226 can apply one or more regularization techniques to fit the algorithm 1216 to the training data properly, which helps constraint the resulting AI model 1230 and improves its ability for generalized application. Examples of regularization techniques include lasso (L1) regularization, ridge (L2) regularization, and elastic (L1 and L2 regularization).

The application layer 1208 describes how the AI system 1200 is used to solve problem or perform tasks. In an example implementation, the system 400 shown by FIG. 4 can include the application layer 1208.

Computer System

Figure 13:
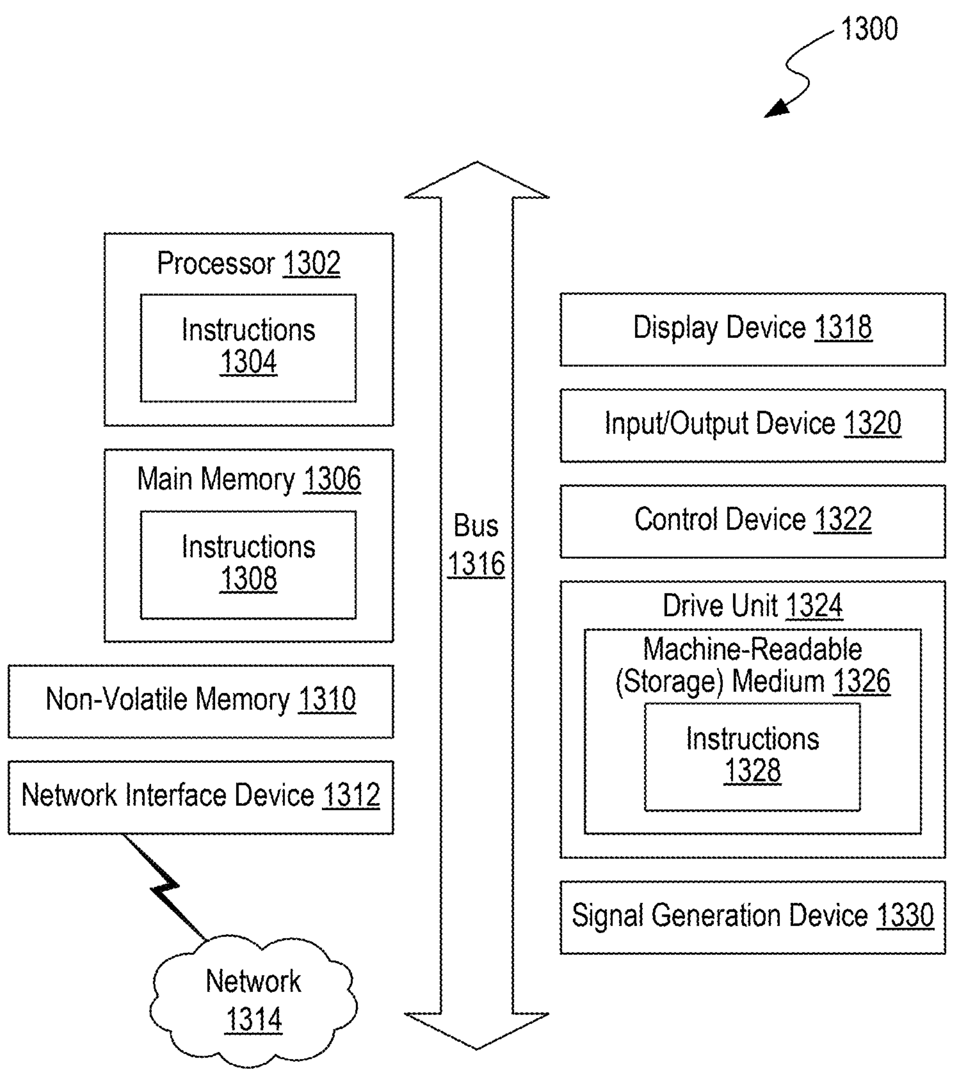
FIG. 13 is a block diagram that illustrates an example of a computer system in which at least some operations described herein can be implemented.

FIG. 13 is a block diagram that illustrates an example of a computer system 1300 in which at least some operations described herein can be implemented. As shown, the computer system 1300 can include: one or more processors 1302 (sometimes referred to as data processors), main memory 1306, non-volatile memory 1310, a network interface device 1312, a display device 1318, an input/output device 1320, a control device 1322 (e.g., keyboard and pointing device), a drive unit 1324 that includes a machine-readable (storage) medium 1326, and a signal generation device 1330 that are communicatively connected to a bus 1316. The bus 1316 represents one or more physical buses and/or point-to-point connections that are connected by appropriate bridges, adapters, or controllers. Various common components (e.g., cache memory) are omitted from FIG. 13 for brevity. Instead, the computer system 1300 is intended to illustrate a hardware device on which components illustrated or described relative to the examples of the Figures and any other components described in this specification can be implemented.

The computer system 1300 can take any suitable physical form. For example, the computer system 1300 can share a similar architecture as that of a server computer, personal computer (PC), tablet computer, mobile telephone, wearable electronic device, network-connected ("smart") device (e.g., a television or home assistant device), AR/VR system (e.g., head-mounted display), or any electronic device capable of executing a set of instructions that specify action(s) to be taken by the computer system 1300. In some implementations, the computer system 1300 can be an embedded computer system, a system-on-chip (SOC), a single-board computer (SBC) system, or a distributed system such as a mesh of computer systems or include one or more cloud components in one or more networks. Where appropriate, one or more computer systems 1300 can perform operations in real time, near real time, or in batch mode.

The network interface device 1312 enables the computer system 1300 to mediate data in a network 1314 with an entity that is external to the computer system 1300 through any communication protocol supported by the computer system 1300 and the external entity. Examples of the network interface device 1312 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1306, non-volatile memory 1310, and machine-readable medium 1326) can be local, remote, or distributed. Although shown as a single medium, the machine-readable medium 1326 can include multiple media (e.g., a centralized/distributed database and/or associated caches and servers) that store one or more sets of instructions 1328. The machine-readable medium 1326 can include any medium that is capable of storing, encoding, or carrying a set of instructions for execution by the computer system 1300. The machine-readable medium 1326 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1310, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1304, 1308, 1328) set at various times in various memory and storage devices in computing device(s). When read and executed by the processor 1302, the instruction(s) cause the computer system 1300 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above and any that may be listed in accompanying filing papers are incorporated herein by reference in their entireties, except for any subject matter disclaimers or disavowals and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A non-transitory, computer-readable storage medium comprising instructions recorded thereon, wherein the instructions, when executed by at least one data processor of a computer system, cause the computer system to:

synchronize contact information for at least one contact from electronic communication services integrated with the computer system;

extract at least one attribute of the at least one contact from the contact information, wherein the at least one attribute includes at least one of a name of the at least one contact, an electronic communication address of the at least one contact, an entity that the at least one contact is associated with, a title of the at least one contact, or a custom field;

automatically deduplicate the contact information based on the at least one attribute;

generate a profile of the at least one contact, wherein the profile includes the at least one attribute;

generate, in a database, a block data model comprising multiple nested blocks, wherein each block includes a parent attribute identifying a parent block of the each block;

store the profile of the at least one contact within a block of the block data model;

enable sharing of the profile of the at least one contact across accounts associated with the database by traversing the parent attribute from the block storing the profile to a root of the multiple nested blocks;

track interactions that include the at least one contact by monitoring electronic communications or calendar events that include the at least one contact;

generate one or more interaction metrics based on the tracked interactions;

store the one or more interaction metrics in the block data model;

operate a trained transformer-based neural network comprising multiple neural network layers to analyze the one or more interaction metrics stored in the block data model;

automatically re-train the transformer-based neural network in response to a loss function of the transformer-based neural network exceeding a threshold;

adjust at least one model parameter of the transformer-based neural network to reduce the loss function during the re-training; and update the profile of the at least one contact in the block data model based on analyzing the one or more interaction metrics.

2. The non-transitory, computer-readable storage medium of claim 1, wherein the computer system is caused to:

implement permission controls for access to the profile of the at least one contact by the accounts.

3. The non-transitory, computer-readable storage medium of claim 1, wherein the computer system is caused to:

link the profile of the at least one contact to associated tasks, the electronic communications, and notes.

4. The non-transitory, computer-readable storage medium of claim 1, wherein the computer system is caused to:
determine a frequency of the interactions;
generate a relationship status for the at least one contact based on the frequency; and
prioritize the at least one contact based on the relationship status.

5. The non-transitory, computer-readable storage medium of claim 1, wherein the database is integrated with the electronic communication services or a third-party tool using an application programming interface.

6. The non-transitory, computer-readable storage medium of claim 1, wherein the multiple nested blocks include content arrays storing block IDs of the multiple nested blocks.

7. The non-transitory, computer-readable storage medium of claim 1, wherein the computer system is caused to:
generate, using an artificial intelligence (AI) system, follow-up suggestions based on the interactions.

8. A computer system comprising:
at least one hardware processor; and
at least one non-transitory memory storing instructions, which, when executed by the at least one hardware processor, cause the computer system to:
obtain contact information for at least one contact from electronic communication services integrated with the computer system;
extract at least one attribute of the at least one contact from the contact information;
automatically deduplicate the contact information based on the at least one attribute;
generate a profile of the at least one contact;
generate, in a database, a block data model comprising multiple nested blocks,
wherein each block includes a parent attribute identifying a parent block of the each block;
store the profile of the at least one contact within a block of the block data model;
enable sharing of the profile across the database by traversing the parent attribute from the block storing the profile to a root of the multiple nested blocks;
track interactions that include the at least one contact by monitoring electronic communications or calendar events that include the at least one contact;
generate one or more interaction metrics based on the tracked interactions;
operate a trained transformer-based neural network to analyze the one or more interaction metrics;
re-train the transformer-based neural network in response to a loss function of the transformer-based neural network exceeding a threshold;
adjust at least one model parameter of the transformer-based neural network to reduce the loss function during the re-training; and
update the profile of the at least one contact in the block data model based on analyzing the one or more interaction metrics.

9. The computer system of claim 8, wherein the computer system is caused to:
implement permission controls for access to the profile of the at least one contact by accounts associated with the database.

10. The computer system of claim 8, wherein the computer system is caused to:
link the profile of the at least one contact to associated tasks, electronic communication, and notes.

11. The computer system of claim 8, wherein the computer system is caused to:
determine a frequency of the interactions;
generate a relationship status for the at least one contact based on the frequency; and
prioritize the at least one contact based on the relationship status.

12. The computer system of claim 8, wherein the database is integrated with the electronic communication services or a third-party tool using an application programming interface.

13. The computer system of claim 8, wherein the multiple nested blocks include content arrays storing block IDs of the multiple nested blocks.

14. The computer system of claim 8, wherein the computer system is caused to:
generate, using an artificial intelligence (AI) system, follow-up suggestions based on the interactions.

15. A method performed by a computer system, the method comprising:
obtaining contact information for at least one contact from electronic communication services integrated with the computer system;
extracting at least one attribute of the at least one contact from the contact information;
deduplicating the contact information based on the at least one attribute;
generating a profile of the at least one contact;
generating, in a database, a block data model comprising multiple nested blocks,
wherein each block includes a parent attribute identifying a parent block of the each block;
storing the profile of the at least one contact within a block of the block data model;
enabling sharing of the profile across the database by traversing the parent attribute from the block storing the profile to a root of the multiple nested blocks;
tracking interactions that include the at least one contact by monitoring electronic communications or events that include the at least one contact;
generating one or more interaction metrics based on the tracked interactions;
operating a trained transformer-based neural network to analyze the one or more interaction metrics;
re-training the transformer-based neural network in response to a loss function of the transformer-based neural network exceeding a threshold;
adjusting at least one model parameter of the transformer-based neural network to reduce the loss function during the re-training; and
updating the profile of the at least one contact in the block data model based on analyzing the one or more interaction metrics.

16. The method of claim 15, comprising:
implementing permission controls for access to the profile of the at least one contact by accounts associated with the database.

17. The method of claim 15, comprising:
linking the profile of the at least one contact to associated tasks, electronic communications, and notes.

18. The method of claim 15, comprising:
determining a frequency of the interactions;
generating a relationship status for the at least one contact based on the frequency; and prioritizing the at least one contact based on the relationship status.

19. The method of claim 15, wherein the database is integrated with the electronic communication services or a third-party tool using an application programming interface.

20. The method of claim 15, wherein the multiple nested blocks include content arrays storing block IDs of the multiple nested blocks.

* * * * *